(12) United States Patent
McCanne et al.

(10) Patent No.: US 8,312,101 B2
(45) Date of Patent: Nov. 13, 2012

(54) TRANSACTION ACCELERATOR FOR CLIENT-SERVER COMMUNICATIONS SYSTEMS

(75) Inventors: Steven McCanne, Berkeley, CA (US); Michael J. Demmer, San Francisco, CA (US)

(73) Assignee: Riverbed Technology, Inc., San Francisco, CA (US)

( * ) Notice: Subject to any disclaimer, the term of this patent is extended or adjusted under 35 U.S.C. 154(b) by 0 days.

(21) Appl. No.: 13/251,148

(22) Filed: Sep. 30, 2011

(65) Prior Publication Data

US 2012/0084465 A1   Apr. 5, 2012

Related U.S. Application Data

(63) Continuation of application No. 12/916,112, filed on Oct. 29, 2010, which is a continuation of application No. 12/191,805, filed on Aug. 14, 2008, now Pat. No. 7,849,134, which is a continuation of application No. 11/229,016, filed on Sep. 15, 2005, now Pat. No. 7,428,573, which is a continuation of application No. 10/285,315, filed on Oct. 30, 2002, now Pat. No. 7,120,666.

(51) Int. Cl.
*G06F 15/167* (2006.01)

(52) U.S. Cl. ......... 709/216; 709/212; 709/217; 709/246

(58) Field of Classification Search .................. 709/212, 709/216, 217, 246
See application file for complete search history.

(56) References Cited

U.S. PATENT DOCUMENTS

| | | | |
|---|---|---|---|
| 4,641,274 A | 2/1987 | Swank | |
| 4,988,998 A | 1/1991 | O'Brien | |
| 5,371,852 A | 12/1994 | Attanasio et al. | |
| 5,414,850 A | 5/1995 | Whiting | |
| 5,598,566 A * | 1/1997 | Pascucci et al. | 713/324 |
| 5,737,594 A | 4/1998 | Williams | |
| 5,754,774 A | 5/1998 | Bittinger et al. | |
| 5,771,355 A | 6/1998 | Kuzma | |
| 5,822,746 A | 10/1998 | Williams | |
| 5,838,963 A | 11/1998 | Griffiths | |
| 5,867,661 A | 2/1999 | Bittinger et al. | |

(Continued)

FOREIGN PATENT DOCUMENTS

EP   0813326 A   12/1997

(Continued)

OTHER PUBLICATIONS

Border et al. "Performance Enhancing Proxies Intended to Mitigate Link-Related Degradations," Network Working Group Request for Comments; 3135 (Jun. 2001).

(Continued)

*Primary Examiner* — Phuoc Nguyen
(74) *Attorney, Agent, or Firm* — Philip H. Albert; Kilpatrick Townsend & Stockton, LLP

(57) ABSTRACT

Transactions are accelerated by the transaction handlers by storing segments of data used in the transactions in persistent segment storage accessible to the server side transaction handler and in persistent segment storage accessible to the client side transaction handler. When data is to be sent between the transaction handlers, the sending transaction handler compares the segments of the data to be sent with segments stored in its persistent segment storage and replaces segments of data with references to entries in its persistent segment storage that match or closely match the segments of data to be replaced. The receiving transaction store reconstructs the data sent by replacing segment references with corresponding segment data from its persistent segment storage.

28 Claims, 11 Drawing Sheets

U.S. PATENT DOCUMENTS

| | | | |
|---|---|---|---|
| 5,903,723 | A | 5/1999 | Beck et al. |
| 5,931,913 | A | 8/1999 | Meriwether et al. |
| 5,977,890 | A | 11/1999 | Rigoutsos et al. |
| 5,990,810 | A | 11/1999 | Williams |
| 5,999,949 | A | 12/1999 | Crandall |
| 6,009,462 | A | 12/1999 | Birrell et al. |
| 6,076,084 | A | 6/2000 | Harlan |
| 6,118,786 | A | 9/2000 | Tiernan et al. |
| 6,163,811 | A | 12/2000 | Porter |
| 6,178,461 | B1 | 1/2001 | Chan et al. |
| 6,233,253 | B1 | 5/2001 | Settle et al. |
| 6,253,264 | B1 | 6/2001 | Sebastian |
| 6,324,581 | B1 | 11/2001 | Xu et al. |
| 6,369,723 | B1 | 4/2002 | Pieterse et al. |
| 6,397,253 | B1 | 5/2002 | Quinlan et al. |
| 6,415,329 | B1 | 7/2002 | Gelman et al. |
| 6,449,615 | B1 | 9/2002 | Liu et al. |
| 6,449,658 | B1 | 9/2002 | Lafe et al. |
| 6,553,141 | B1 | 4/2003 | Huffman |
| 6,642,860 | B2 | 11/2003 | Meulenbroeks |
| 6,643,710 | B1 | 11/2003 | Thorne et al. |
| 6,667,700 | B1 | 12/2003 | McCanne et al. |
| 6,678,828 | B1 | 1/2004 | Pham et al. |
| 6,704,730 | B2 | 3/2004 | Moulton et al. |
| 6,721,780 | B1 | 4/2004 | Kasriel et al. |
| 6,772,193 | B1 | 8/2004 | Igawa et al. |
| 6,856,651 | B2 | 2/2005 | Singh |
| 6,883,035 | B2 | 4/2005 | Hannu et al. |
| 7,058,699 | B1 | 6/2006 | Chiou et al. |
| 7,058,958 | B1 | 6/2006 | Shutt et al. |
| 7,065,781 | B1 | 6/2006 | Entwistle |
| 7,120,666 | B2 | 10/2006 | McCanne et al. |
| 7,124,166 | B2 | 10/2006 | Brown |
| 7,139,811 | B2 | 11/2006 | Lev Ran et al. |
| 7,165,095 | B2 | 1/2007 | Sim |
| 7,181,523 | B2 | 2/2007 | Sim |
| 7,216,135 | B2 * | 5/2007 | Sawdon et al. ........ 707/999.001 |
| 7,230,949 | B2 | 6/2007 | Bharali et al. |
| 7,336,682 | B2 | 2/2008 | Singh |
| 7,340,528 | B2 * | 3/2008 | Noblecourt et al. .......... 709/231 |
| 7,370,120 | B2 | 5/2008 | Kirsch et al. |
| 7,499,981 | B2 | 3/2009 | Harrow et al. |
| 7,602,819 | B2 | 10/2009 | Leyendecker |
| 5,990,810 | C1 | 4/2011 | Williams |
| 7,934,008 | B2 | 4/2011 | Tabatabai et al. |
| 7,948,921 | B1 | 5/2011 | Hughes et al. |
| 2002/0087547 | A1 | 7/2002 | Kausik et al. |
| 2002/0120763 | A1 | 8/2002 | Miloushev et al. |
| 2002/0138511 | A1 | 9/2002 | Psounis et al. |
| 2002/0165911 | A1 | 11/2002 | Gabber et al. |
| 2002/0169818 | A1 | 11/2002 | Stewart et al. |
| 2002/0169828 | A1 | 11/2002 | Blanchard |
| 2002/0194382 | A1 | 12/2002 | Kausik et al. |
| 2003/0046369 | A1 | 3/2003 | Sim et al. |
| 2003/0105837 | A1 | 6/2003 | Kamen et al. |
| 2004/0088376 | A1 | 5/2004 | McCanne et al. |
| 2004/0215746 | A1 | 10/2004 | McCanne et al. |
| 2005/0102364 | A1 | 5/2005 | Ozzie |
| 2006/0179110 | A1 | 8/2006 | Brown |
| 2008/0031240 | A1 | 2/2008 | Hughes et al. |
| 2009/0240705 | A1 | 9/2009 | Miloushev et al. |

FOREIGN PATENT DOCUMENTS

| | | |
|---|---|---|
| EP | 1056279 | 9/2001 |
| JP | 62-050952 A | 3/1987 |
| JP | 10-198680 A | 7/1998 |
| JP | 11-168390 A | 6/1999 |
| JP | 2001-526853 A | 12/2001 |
| JP | 2002-2359649 A | 12/2002 |
| WO | WO 95-20793 A | 8/1995 |
| WO | WO 98/16067 A2 | 4/1998 |
| WO | WO 01-63420 A | 8/2001 |
| WO | WO 01/65831 A2 | 9/2001 |
| WO | WO 01-80022 A | 10/2001 |
| WO | WO 01/97526 | 12/2001 |

OTHER PUBLICATIONS

Mogul et al. "Delta encoding in HTTP," Network Working Group Internet-Draft (Oct. 2001).

Johnson, J.H., "Identifying Redundancy in Source Code Using Fingerprints," Oct. 25-28, 1993, Proceedings of CAS CON '93, Toronto, Ontario, Canada, pp. 171-183.

Japan Patent Office office action (Questioning) for patent application JP2004-550165 (Sep. 15, 2011).

Japan Patent Office office action for patent application JP2004-550165 (Aug. 23, 2010).

Japan Patent Office office action for patent application JP2004-550165 (Jul. 22, 2009).

"Transmultiplexing, Transcontrol and Transscrambling of MPEC-2/DVD Signal", Bungum, Int'l Broadcasting Convention, London, GB, Sep. 12, 1996, pp. 288-293.

"Unleashing the True Power of Today's Networks", A Peribit White Paper, Aug. 2002, pp. 1-13, URL=http://www.peribit.com/products/etc/0217w02punl.htm.

Amer et al. "File access prediction with adjustable accuracy" Institute of Electrical and Electronic Engineers, Conference Proceedings of the 2002 IEEE International Performance, Computing and Communications Conference, Phoenix, AZ, Apr. 3-5, 2002 vol. Conf. 21, pp. 131-140.

Chakrabarti, Samidy; "Low-Bandwidth Web Access with Tandem Proxies"; 2002, Department of Electrical Engineering, Massachusetts Institute of Technology, pp. 1-64.

Factor et al. "Compression in the presence of shared data;" 2001; *Information Sciences*; vol. 135; pp. 29-41.

Franaszek et al. "Parallel compression with cooperative dictionary construction" Data Compression Conference, 1996 DCC '96. Proceedings, Mar. 31-Apr. 3, 1996, pp. 200-209.

Lin et al. "Code compression techniques using operand field remapping" Computers and Digital Techniques, IEEE Proceedings vol. 149, Issue 1, Jan. 2002, pp. 25-31.

Manber et al., "A Text Compression Scheme That Allows Fast Searching Directly in the Compressed File", Department of Computer Science, Mar. 1993, pp. 1-12, Technical Report #93-07, University of Arizona, Tucson, Arizona.

Manber et al., "Finding Similar Files in a Large File System" Department of Computer Science, Oct. 1993, pp. 1-10, Technical Report #93-33, University of Arizona, Tucson, Arizona.

Manber et al., "GLIMPSE: A Tool to Search Through Entire File Systems", Department of Computer Science, Oct. 1993, pp. 1-10, Technical Report #93-34, University of Arizona, Tucson, Arizona.

Mellia et al. "TCP Smart-Framing: using smart segments to enhance the performance of TCP" Casetti, C.; Global Telecommunications Conference, 2001. GLOBECOM '01. IEEE , vol. 3 , Nov. 25-29, 2001 pp. 1708-1712 vol. 3.

Muthitacharoen, et al., "A Low-bandwidth Network File System", Symposium on Operating Systems Principles, 2001, pp. 147-187, URL=http://www.pdos.lcs.mit.edu/papers/lbfs:sosp01/lbfs.pdf.

Padmanabhan et al., "Using Predictive Prefetching to Improve World Wide Web Latency," IEEE Transactions on Antennas and Propagation, 26(3):22-36 (1996).

Sayood et al., "Recursively Indexed Quantization of Memoryless Sources", IEEE Transactions on Information Theory, Sep. 1992, pp. 1602-1609, vol. IT-38, No. 5.

Spring et al. "A protocol-independent technique for eliminating redundant network traffic", Aug. 2000, Proceedings of ACM SIGCOMM 9 , pp. www.acm.org.

Notice of Allowance mailed May 29, 2012 in U.S. Appl. No. 12/916,112, 12 pages.

Notice of Allowance mailed Jul. 30, 2012 in U.S. Appl. No. 13/459,065, 9 pages.

\* cited by examiner

| REFERENCE DATA | | TIME STAMP IN | |
|---|---|---|---|
| $R_1$ | SEGMENT 1 DATA | 00/00/0000, 00:00:00 | ... |
| $R_2$ | SEGMENT 2 DATA | ... | ... |
| $R_3$ | SEGMENT 3 DATA | ... | ... |
| ... | ... | | |
FIG. 3
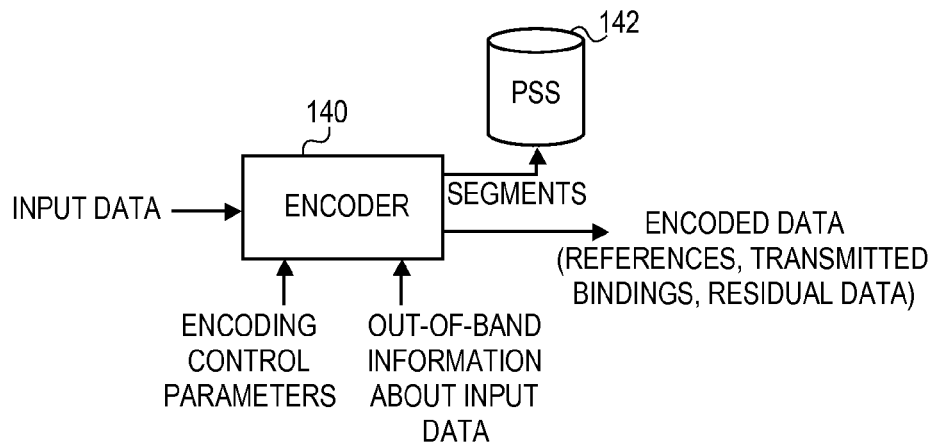
FIG. 4
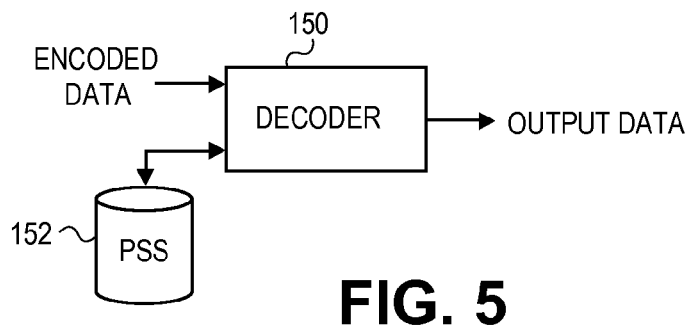
FIG. 5

TRANSACTION ACCELERATOR FOR CLIENT-SERVER COMMUNICATIONS SYSTEMS

CROSS-REFERENCES TO RELATED APPLICATIONS

This application is a continuation of U.S. patent application Ser. No. 12/916,112 filed Oct. 29, 2010, which is a continuation of U.S. patent application Ser. No. 12/191,805 filed Aug. 14, 2008 (now U.S. Pat. No. 7,849,134), which is a continuation of U.S. patent application Ser. No. 11/229,016 filed Sep. 15, 2005 (now U.S. Pat. No. 7,428,573) entitled "Transaction Accelerator for Client-Server Communication Systems" (hereinafter "McCanne III"), which is a continuation of U.S. patent application Ser. No. 10/285,315 filed Oct. 30, 2002 (now U.S. Pat. No. 7,120,666)(hereinafter "McCanne I").

McCanne I and III and U.S. Pat. No. 6,667,700 entitled "Content-Based Segmentation Scheme for Data Compression in Storage and Transmission Including Hierarchical Segment Representation" (hereinafter "McCanne II"), are all incorporated by reference herein for all purposes.

BACKGROUND OF THE INVENTION

The present invention relates generally to systems for moving data through limited bandwidth channels efficiently and more particularly to having data available in response to a request for data over a limited channel faster than if the data were sent unprocessed in response to the request.

Many applications and systems that operate well over high-speed connections need to be adapted to run on slower speed connections. For example, operating a file system over a local area network (LAN) works well, but often files need to be accessed where a high-speed link, such as a LAN, is not available along the entire path from the client needing access to the file and the file server serving the file. Similar design problems exist for other network services, such as e-mail services, computational services, multimedia, video conferencing, database querying, office collaboration, etc.

In a networked file system, for example, files used by applications in one place might be stored in another place. In a typical scenario, a number of users operating at computers networked throughout an organization and/or a geographic region share a file or sets of files that are stored in a file system. The file system might be near one of the users, but typically it is remote from most of the users, but the users often expect the files to appear to be near their sites.

As used herein, "client" generally refers to a computer, computing device, peripheral, electronics, or the like, that makes a request for data or an action, while "server" generally refers to a computer, computing device, peripheral, electronics, or the like, that operates in response to requests for data or action made by one or more clients.

A request can be for operation of the computer, computing device, peripheral, electronics, or the like, and/or for an application being executed or controlled by the client. One example is a computer running a word processing program that needs a document stored externally to the computer and uses a network file system client to make a request over a network to a file server. Another example is a request for an action directed at a server that itself performs the action, such as a print server, a processing server, a control server, an equipment interface server, and I/O (input/output) server, etc.

A request is often satisfied by a response message supplying the data requested or performing the action requested, or a response message indicating an inability to service the request, such as an error message or an alert to a monitoring system of a failed or improper request. A server might also block a request, forward a request, transform a request, or the like, and then respond to the request or not respond to the request.

In some instances, an object normally thought of as a server can act as a client and make requests and an object normally thought of as a client can act as a server and respond to requests. Furthermore, a single object might be both a server and a client, for other servers/clients or for itself For example, a desktop computer might be running a database client and a user interface for the database client. If the desktop computer user manipulated the database client to cause it to make a request for data, the database client would issue a request, presumably to a database server. If the database server were running on the same desktop computer, the desktop computer would be, in effect, making a request to itself It should be understood that, as used herein, clients and servers are often distinct and separated by a network, physical distance, security measures and other barriers, but those are not required characteristics of clients and servers.

In some cases, clients and servers are not necessarily exclusive. For example, in a peer-to-peer network, one peer might make a request of another peer but might also serve responses to that peer. Therefore, it should be understood that while the terms "client" and "server" are typically used herein as the actors making "requests" and providing "responses", respectively, those elements might take on other roles not clearly delineated by the client-server paradigm.

Generally, a request-response cycle can be referred to as a "transaction" and for a given transaction, some object (physical, logical and/or virtual) can be said to be the "client" for that transaction and some other object (physical, logical and/ or virtual) can be said to be the "server" for that transaction.

Often client-server transactions flow directly between the client and the server across a packet network, but in some environments these transactions can be intercepted and forwarded through transport-level or application-level devices called "proxies". In this case, a proxy is the terminus for the client connection and initiates another connection to the server on behalf of the client. Alternatively, the proxy connects to one or more other proxies that in turn connect to the server. Each proxy may forward, modify, or otherwise transform the transactions as they flow from the client to the server and vice versa. Examples of proxies include (1) Web proxies that enhance performance through caching or enhance security by controlling access to servers, (2) mail relays that forward mail from a client to another mail server, (3) DNS relays that cache DNS name resolutions, and so forth.

As used herein, the terms "near", "far", "local" and "remote" might refer to physical distance, but more typically they refer to effective distance. The effective distance between two computers, computing devices, servers, clients, peripherals, etc. is, at least approximately, a measure of the difficulty of getting data between the two computers. For example, where file data is stored on a hard drive connected directly to a computer processor using that file data, and the connection is through a dedicated high-speed bus, the hard drive and the computer processor are effectively "near" each other, but where the traffic between the hard drive and the computer processor is over a slow bus, with more intervening events possible to waylay the data, the hard drive and the computer processor are said to be farther apart.

Greater and lesser physical distances need not correspond with greater and lesser effective distances. For example, a file server and a desktop computer separated by miles of highquality and high-bandwidth fiber optics might have a smaller effective distance compared with a file server and a desktop computer separated by a few feet and coupled via a wireless connection in a noisy environment.

In general, where the effective distances are great, more effort is needed to create the impression of a shorter effective distance. Much has been developed to create this impression. For example, when the effective distance is increased due to limited bandwidth, that limitation can be ameliorated using compression or by caching. Compression is a process of representing a number of bits of data using fewer bits and doing so in a way that the original bits or at least a sufficient approximation of the original bits can be recovered from an inverse of the compression process in most cases. Caching is the process of storing previously transmitted results in the hopes that the user will request the results again and receive a response more quickly from the cache than if the results had to come from the original provider.

Compression allows for more efficient use of a limited bandwidth and might result in less latency, but in some cases, no latency improvement occurs. Latency, with respect to client-server transactions, is a measure of the delay between when a request for data is made and the requested data is received. In some cases, compression might add to the latency, if time is needed to compress data after the request is made and time is needed to decompress the data after it is received. This may be able to be improved if the data can be compressed ahead of time, before the request is made, but that may not be feasible if the data is not necessarily available ahead of time for compression, or if the volume of data from which the request will be served is too large relative to the amount of data likely to be used.

Caching also provides some help in reducing effective distance, but in some situations it does not help much. For example, where a single processor is retrieving data from memory it controls and does so in a repetitive fashion, as might be the case when reading processor instructions from memory, caching can greatly speed a processor's tasks. In a typical cache arrangement, a requestor requests data from some memory, device or the like and the results are provided to the requestor and stored in a cache having a faster response time than the original device supplying the data. Then, when the requestor requests that data again, if it is still in the cache, the cache can return the data in response to the request before the original device could have returned it and the request is satisfied that much sooner.

Caching has its difficulties, one of which is that the data might change at the source and the cache would then be supplying "stale" data to the requestor. This is the "cache consistency" problem. Another problem with caching is that the original source of the data might want to track usage of data and would not be aware of uses that were served from the cache as opposed to from the original source. For example, where a Web server is remote from a number of computers running Web browsers that are "pointed to" that Web server, the Web browsers might cache Web pages from that site as they are viewed, to avoid delays that might occur in downloading the Web page again. While this would improve performance in many cases, and reduce the load on the Web server, the Web server operator might try to track the total number of "page views" but would be ignorant of those served by the cache. In some cases, an Internet service provider might operate the cache remote from the browsers and provide cached content for a large number of browsers, so a Web server operator might even miss unique users entirely.

Additionally, the mechanism underlying Web caching provides only a loose model for consistency between the origin data and the cached data. Generally, Web data is cached for a period of time based on heuristics or hints in the transactions independent of changes to the origin data. This means that cached Web data can occasionally become inconsistent with the origin server and such inconsistencies are simply tolerated by Web site operators, service providers, and users as a reasonable performance trade-off. Unfortunately, this model of loose consistency is entirely inappropriate for general client-server communication like networked file systems. When a client interacts with a file server, the consistency model must be wholly correct and accurate to ensure proper operation of the application using the file system.

Some solutions to network responsiveness deal with the problem at the file system or at network layers. One proposed solution is the use of a low-bandwidth network file system, such as that described in Muthitacharoen, A., et al., "*A Low-Bandwidth Network File System*", in Proceedings of the 18th ACM Symposium on Operating Systems Principles (SOSP '01), pp. 174-187 (Chateau Lake Louise, Banff, Canada, October 2001) (in vol. 35, 5 of ACM SIGOPS Operating Systems Review, ACM Press). In that system, called LBFS, clients employ "whole file" caching whereby upon a file open operation, the client fetches all the data in the file from the server, then operates on the locally cached copy of the file data. If the client makes changes to the file, those changes are propagated back to the server when the client closes the file. To optimize these transfers, LBFS replaces pieces of the file with hashes, and the recipient uses the hashes in conjunction with a local file store to resolve the hashes to the original portions of the file. Such systems have limitations in that they are tied to file systems and generally require modification of the clients and servers between which responsiveness is to be improved. Furthermore, the hashing scheme operates over blocks of relatively large (average) size, which works poorly when files are subject to fine-grained changes over time. Finally, LBFS is by design intimately tied to a network file system protocol. It is not able to optimize or accelerate other types of client-server transactions, e.g., e-mail, Web, streaming media, and so forth.

Another proposed solution is suggested by Spring, N., et al., "*A Protocol-Independent Technique for Eliminating Redundant Network Traffic*", in Proceedings of ACM SIGCOMM (August 2000). As described in that reference, network packets that are similar to recently transmitted packets can be reduced in size by identifying repeated strings and replacing the repeated strings with tokens to be resolved from a shared packet cache at either end of a network link. This approach, while beneficial, has a number of shortcomings. Because it operates solely on individual packets, the performance gains that accrue are limited by the ratio of the packet payload size to the packet header (since the packet header is generally not compressible using the described technique). Also, because the mechanism is implemented at the packet level, it only applies to regions of the network where two ends of a communicating path have been configured with the device. This configuration can be difficult to achieve, and may be impractical in certain environments. Also, by caching network packets using a relatively small memory-based cache with a first-in first-out replacement policy (without the aid of, for instance, a large disk-based backing store), the efficacy of the approach is limited to detecting and exploiting communication redundancies that are fairly localized in time. Finally, because this approach has no ties into the applications or servers that generate the (redundant) network traffic, there is no ability to anticipate where data might be used and pre-stage that data in the far-end cache providing potential further acceleration and optimization of network traffic.

In a business that spans operations over wide area networks, a number of less than ideal patches have been done in response to the problems described above. For example, some businesses resort to buying more and more bandwidth to keep responsiveness up. Individuals in the organization will attempt local solutions by turning to ad hoc e-mail collaboration (which might make one file more readily accessible by one user, but adds version control problems and adds to the overall network load). Other attempts to solve the problem might involve manually creating copies of data to operate on or pushing read-only replicas to remote servers.

In view of the above problems and the limitations with existing solutions, improvements can be made in how data is transported for transactions over a network.

BRIEF SUMMARY OF THE INVENTION

In embodiments of a network having transaction acceleration, for an accelerated transaction, a client directs a request to a client-side transaction handler that forwards the request to a server-side transaction handler, which in turn provides the request, or a representation thereof, to a server for responding to the request. The server sends the response to the server-side transaction handler, which forwards the response to the client-side transaction handler, which in turn provides the response to the client. Transactions are accelerated by the transaction handlers by storing segments of data used in the transactions in persistent segment storage accessible to the server-side transaction handler and in persistent segment storage accessible to the client-side transaction handler. When data is to be sent between the transaction handlers, the sending transaction handler compares the segments of the data to be sent with segments stored in its persistent segment storage and replaces segments of data with references to entries in its persistent segment storage that match or closely match the segments of data to be replaced. The data to be sent might be sent from a client to a server, from a server to a client, from a peer to a peer, etc. The receiving transaction store then reconstructs the data sent by replacing the segment references with corresponding segment data from its persistent segment storage. If segments are referred to but do not exist in the receiver's persistent segment store, the receiver can issue requests for the missing segments from the sender via a side channel or via the link used to send the references to the segments. Where the persistent segment storage at each end is populated with segments likely to be repeated, such replacement of segments will occur often, resulting in much less bandwidth use over the network, thus accelerating transactions.

The transaction accelerators could be dedicated, such that the client-side transaction accelerator interacts with only one client and the server-side transaction accelerator interacts with only one server, but the transaction accelerators might also handle more than one client and/or more than one server. Where multiple transactions are handled, either for the same clients and servers, or over possibly different clients and possibly different servers, the segments stored in the persistent segment stores can relate to different transactions, different clients and/or different servers. For example, if a transaction accelerator encounters a segment of data and stores it in its persistent segment store in handling a given transaction, a reference to that segment of data might be used again in a different transaction, relating to a different client or the same client and a different server or the same server, or relating to an entirely different client-server application.

In some embodiments, transaction accelerators' persistent segment stores are pre-populated with segment data from other transaction accelerators, so that when a transaction occurs, more segments are available at the sender end for replacement with references and more segments are available at the receiving end for reconstruction from the references.

Other features and advantages of the invention will be apparent in view of the following detailed description and preferred embodiments.

BRIEF DESCRIPTION OF THE DRAWINGS

FIG. 3 is an illustration of data organization in embodiments of a persistent segment store ("PSS") as might be used with the system shown in FIG. 1.

FIG. 4 is a block diagram of an encoder as might be used in the transaction transformers ("TT") of FIG. 2.

FIG. 5 is a block diagram of a decoder as might be used in the inverse transaction transformers ("TT-1") of FIG. 2.

DETAILED DESCRIPTION OF THE INVENTION

Figure 1:
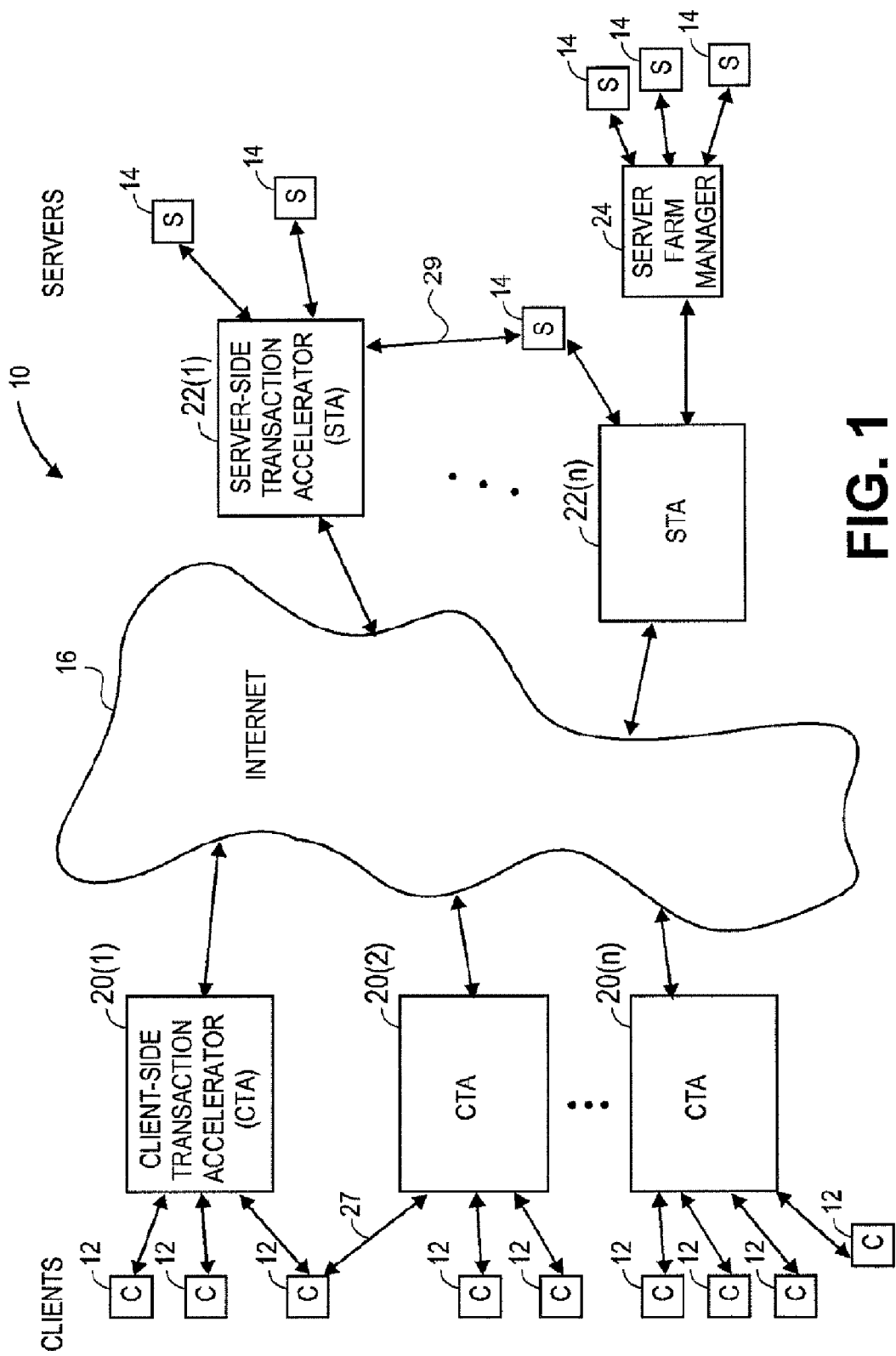
FIG. 1 is a block diagram of a networked client-server system according to embodiments of the present invention.

The present invention has many applications, as will be apparent after reading this disclosure. In describing an embodiment of a transaction acceleration system according to the present invention, only a few of the possible variations are described. Other applications and variations will be apparent to one of ordinary skill in the art, so the invention should not be construed as narrowly as the examples, but rather in accordance with the appended claims.

A transaction, as the term is used herein, is a logical set of steps that result in data moving from one place to another. In some cases, the data being moved exists at its origin independent of the transaction, such as a file read transaction where the file exists on the disk of the server. In other cases, the data is generated for the transaction at the origin, such as in response to a request for computation, lookup, etc. Typically, the computer, computer device, etc. initiating the transaction is referred to as the "client" and the computer, computer device, etc. that responds, or is expected to respond, is referred to as the "server". Data can flow in either direction. For example, a file system client might initiate a transaction by requesting a file read. The corresponding data will be returned from the server responding to the request, so in that case, the bulk of the data flows from the server to the client. However, where a client initiates a file write transaction, the bulk of the data flows from the client to the server, either as part of the initial request or as subsequent messages. A transaction can be in multiple parts, but in a simple transaction, a client sends a request (data, a message, a signal, etc., explicitly being the request or indicative of or representing of the request) to a server and the server responds with a response (data, a message, a signal, etc., explicitly being the response or indicative of or representing of the response) to the client. More complex transactions, for example, might involve some back and forth, as might be needed for a server to clarify a request, verify the authority of the client to receive a response to the request, get additional information needed for preparing the response, etc.

Herein, the typical example of a connection between a client and a server is a packet network, but other connection means can also be used, such as a point-to-point wired or wireless channel. These elements will be generalized and referred to here as "nodes" with a channel assumed for communication between the nodes.

A transaction might begin with a client at one node making a request for file data directed to a server at another node, followed by a delivery of a response containing the requested file data. Other transactions might be a request for a specific part of a file, all the file, all or some of another data construct, or a transaction might relate to data flowing from the requestor or relate to a command. Examples of transactions include "read a block", "read a file", "read a stream", "write a block with this data" (an example of data flowing from the requestor), "open a file", "perform a calculation on this data", "get an e-mail with these characteristics", "send an e-mail", "check for new emails", "list directory contents", etc.

Some transactions might involve large amounts of data flowing in one direction or both directions. Some transactions might even involve interactions having more than one requestor and/or more than one receiver. For clarity of description, these many transaction types are described in terms of a typical simple transaction, where one client makes a request of one server and that one server responds to the request in a manner expected by the client. However, upon reading this disclosure, a person of ordinary skill will be able to apply these concepts to one-to-many and many-to-many transactions between client(s) and server(s) or more generally between two nodes. Where data flow is described in one direction, it should be understood that data might flow in the other direction and/or information might flow in only one direction, but data and/or signals flow in both directions to accomplish the movement of information.

Using some of the systems described herein, client access to a server (and vice versa where needed), can be "tunneled" through transaction accelerators that map transactions onto sequences of variable-length segments with content-induced segment cut points. The segments can be stored at various places, typically within high-speed access of both the clients and the servers, with the segments stored using a scalable, persistent naming system. The segments can be decoupled from file-system and other system data blocks and structures, so that a matching segment might be found in multiple contexts. Instead of caching files, blocks, or other system dependent constructs, segments can be stored and bound to references that are used to represent the segment contents.

FIG. 1 is a block diagram of a networked client-server system 10 according to embodiments of the present invention, where such transactions might occur. As shown there, clients 12 are coupled to servers 14 over a network 16, via client-side transaction accelerators ("CTA's") 20 and server-side transaction accelerators ("STA's") 22. Where the location of a transaction accelerator is not specific, it is referred to herein as a "TA", indicating that it could be referring to a client-side transaction accelerator, a server-side transaction accelerator, a peer transaction accelerator, or possibly even a transaction accelerator that is used by clients and servers (and possibly also peers).

Although not shown in FIG. 1, additional paths between clients and servers (also possibly between clients and clients and between servers and servers) might be present and bypass the TA's. Such additional paths could be used to carry conventional traffic, such as transactions that are not likely to benefit from transaction acceleration. By routing such transactions around the TA's, the state of the TA's can remain focused on the accelerated transaction, for example, by not having the persistent segment storage (described below) of a TA storing segments from transactions not likely to benefit from transaction acceleration.

As shown, a CTA 20 might serve one or more clients and multiple CTA's 20 might be implemented on a network. As used herein and unless otherwise indicated, the index "n" refers to an indefinite integer and each distinct use of the index might refer to a different indefinite integer. For example, FIG. 1 illustrates that there can be some number of CTA's and some number of STA's and there need not be a one-to-one correspondence. In general, the number of CTA's might be based on the number of clients, number of expected clients, network layout, etc., while the number of STA's might be based on the number of servers, the number of expected servers, network layout, etc. In some implementations, each server connects to an STA dedicated to that server. In some implementations, a plurality of servers might be coupled to a server farm manager 24 and in turn coupled to Internet 16 via an STA. In some cases, a client might interact with more than one CTA, as illustrated by line 27 in FIG. 1 and a server might interact with more than one STA, as illustrated by line 29 in FIG. 1.

Where one CTA interacts with one STA and requests are received from multiple clients connected to that CTA, the corresponding STA routes each client request to the server(s) to which the request is directed. However, the TA's might be more closely coupled to their clients/servers, such that all, or nearly all, accelerated transactions from one client pass through that one client's CTA, and all, or nearly all, accelerated transactions to one server, pass through that one server's STA. Additionally, in some implementations, TA's share state, so that transactions in one TA might benefit from segments stored at another TA.

Client connections can be routed to a CTA in a number of ways, similar to how prior art proxies function with respect to clients. For example, redirection using the Domain Name System (DNS) can be used to cause a client to resolve the IP address of the CTA instead of the server and thereby route requests to the CTA. Alternatively, the client or the client's application could be statically configured to use a particular CTA or a set of CTA's on a per-application basis. Once the client connection arrives at a CTA, the CTA can then contact the appropriate STA via a lookup process that could work in a number of ways. For example a mapping table (maintained on a centralized and query-able database or configured into the CTA) could be used to direct the CTA to the appropriate STA; or information conveyed in the transaction could allow the CTA to discover which STA to use; or configurable policies could be programmed into the CTA indicating which transport ports should be relayed to which STA's. Likewise, the STA could use similar lookup processes to decide which server to contact for a new client connection arriving from a CTA. The STA could also use data in the transactions to infer what server to connect to (e.g., an HTTP Web request contains the server's identity, as does a connection setup request for a CIFS file server connection).

It should be understood that while the network shown in FIG. 1 is the Internet, a global internetwork of networks in common use today, other networks can be substituted therefor. For example, network traffic over the Internet can travel through public networks and is largely based on TCP/IP (Transmission Control Protocol/Internet Protocol) packet switching. However, the embodiments of the invention shown herein might also be used on networks that are not public, such as intranets, extranets, and virtual private networks. The embodiments might also be used with WAN's, LAN's, WAN/LAN couplings, wireless connections, mobile links, satellite links, cellular telephone networks, or any other network where responsiveness is a concern. In addition, while TCP/IP is the most common packet switched protocol today and thus serves as a good example, other network protocols might be used (Ethernet, etc.). As for overlying protocols, the clients and servers described herein (and peers, as described below) might use HTTP, FTP, SNMP, POP3, IMAP, SMTP, NFS, CIFS, RPC, or other open or proprietary protocols for transport of data.

In a common transaction, a client sends a request for a file, data block or other unit of data to a server and the server responds with data responsive to the request, if possible. For example, where the client is a computer running a computer-aided design (CAD) program and needs a CAD file stored on a file server, the client might formulate a request for the file, encapsulate the request as a message and send that message over the network to the appropriate file server. The file server might then perform authentication, check for the existence of the file at the file server and, if the client is authorized to have the file and the file exists, the file server might create a message or a set of messages or packets containing the data of the file requested and send those messages/packets to the client that made the request.

Using TA's might improve the responsiveness of the transaction, i.e., accelerate the transaction. In a typical environment, the links 27 between clients and CTA's are fast links, such as local area network (LAN) links and the links over network 16 are slower in terms of latency and bandwidth. "Latency" refers to the time between when a message is sent and when it is received (usually measured in time units) and "bandwidth" refers to how much capacity (usually measured in number of bits per unit time) can be carried over a link for a particular task. In many cases, low bandwidth might result in high latency, but those factors can be independent such that it is possible to have high bandwidth but still have high latency. Other factors might affect responsiveness and/or bandwidth cost, such as the reliability of the link and bandwidth usage.

In a typical file request transaction using the TA's, a client 12 initiates a transaction with a server 14 by sending a request message. As explained above, if the transaction involves a small number of bits or other factors exist, using TA's might not get the transaction done any faster and thus the transaction might go over a conventional packet path. However, the transaction might go through the TA's anyway, which might be useful, as explained below, so that the TA's have a more complete view of the traffic. As one example, if a client request passes through the CTA, the CTA can remember the request and match up the response to the request to provide additional services to the client. The CTA might also use the requests to guess at what future events might be and use those guesses to further optimize the transaction acceleration process.

When a server 14 receives a request, it formulates a response to the request, and sends it towards the client via the STA 22 to which it is coupled. In a basic implementation, each client is coupled to one CTA and each server is coupled to one STA, but in more complex implementations, a server might be coupled to more than one STA and use some optimization logic to determine which STA to use at which time. A client might be coupled to more than one CTA and use some optimization logic to determine which CTA to use at which time.

The CTA 20 could send the request to the appropriate STA 22 unchanged and/or the receiving STA 22 could receive the response from a server and send the response to the appropriate CTA 20 unchanged. However, where the request or the response comprises a large amount of data, significant transaction acceleration might be expected in such instances if the data is "compressed" as described herein by storing segments of data at the receiving end and replacing data at the sending end with reference to the stored segments. In some cases, such substitution does not accelerate a transaction, but might still have benefits, such as "priming the pump" with data, so that the receiving ends have segment data that can be used later in reconstructing transmitted data that references those segments. Such concepts are more clearly described with reference to FIG. 2.

Figure 2:
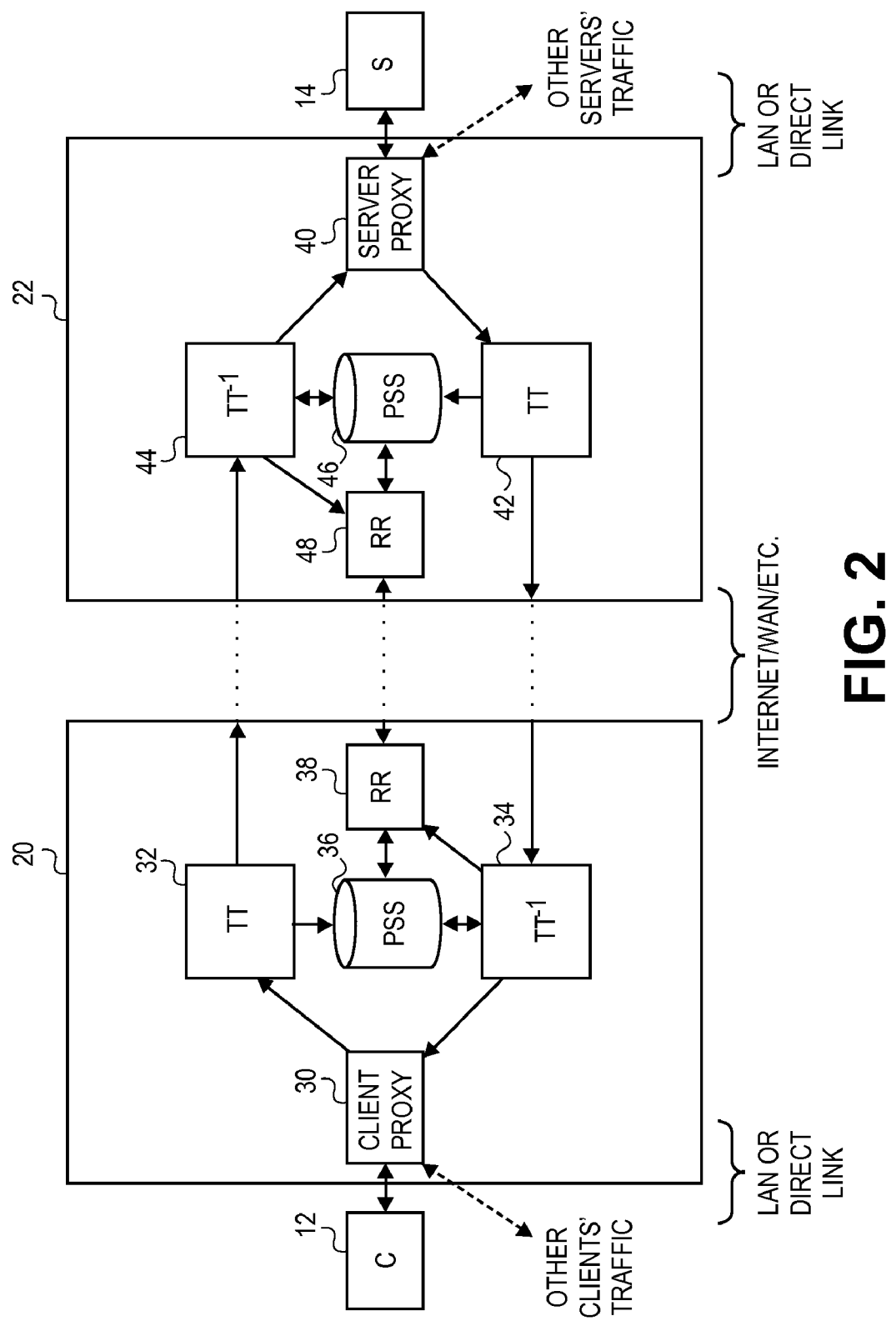
FIG. 2 is a block diagram of the system of FIG. 1, showing a client-side transaction accelerator ("CTA") and a server-side transaction accelerator ("STA") in greater detail and, for space considerations, showing less detail of the overall system.

As will be shown in FIG. 2 and other figures in more detail, transaction requests and responses are routed through TA's instead of going directly from a client to a server. Of course, in some configurations, a CTA and client and/or an STA and server are tightly integrated such that an explicit rerouting is not required. Nonetheless, it is useful to assume that the data is routed, at least because it clarifies that traffic from a client can route through a CTA and traffic from a server can route through an STA, but traffic can also bypass the TA's. Since the TA's can operate at the transport network level, they can operate on transactions as the unit of work.

One configuration for easily routing traffic to be accelerated is via the use of connection proxies. Thus, a CTA would serve as a connection proxy for the server with which a client is entering into a transaction and the STA would serve as a connection proxy for the client to which the server is responding. It should be understood that a TA system could be implemented with symmetric TA's, e.g., where a CTA and an STA are arranged to be substantially similar except possibly that the CTA is set up to expect to encounter new transactions from a client, but not from an STA and an STA is set up to not expect to encounter new transactions from a server, but to expect them from a CTA.

FIG. 2 is a block diagram of portions of system 10, showing a CTA 20, an STA 22 and their interconnections in greater detail. While only one client and one server are shown, it should be understood that the various elements of FIG. 1 might also be present, even if not shown. For example, CTA 20 might be handling transactions from more than one client and STA 22 might be handling transactions with more than one server. As illustrated there in FIG. 2, client 12 is coupled to a client proxy 30 of CTA 20. While other forms of multiplexing and de-multiplexing traffic to and from clients could be used, in this example, a client proxy is used to receive data for CTA 20 from one or more clients and to send data for the CTA 20 to the one or more clients. The other elements of CTA 20 shown in FIG. 2 include a transaction transformer (TT) 32, an inverse transaction transformer ($TT^{-1}$) 34, a persistent segment store (PSS) 36 and a reference resolver (RR) 38. Server 14 is coupled to a server proxy 40 of STA 22, which is shown including elements similar to those of CTA 20, such as a transaction transformer (TT) 42, an inverse transaction transformer ($TT^{-1}$) 44, a persistent segment store (PSS) 46 and a reference resolver (RR) 48.

Client 12 is coupled to client proxy 30, which is coupled to TT 32 and $TT^{-1}$ 34. TT 32 is coupled to PSS 36 and to the network between CTA 20 and STA 22. $TT^{-1}$ 34 is coupled to PSS 36, client proxy 30, RR 38 and to the network between CTA 20 and STA 22. RR 38, as shown, is also coupled to PSS 36 and to the network between CTA 20 and STA 22.

On the other side of the figure, server 14 is coupled to server proxy 40, which is coupled to TT 42 and $TT^{-1}$ 44. TT 42 is coupled to PSS 46 and to the network between STA 22 and CTA 20. $TT^{-1}$ 44 is coupled to PSS 46, server proxy 40, RR 48 and to the network between STA 22 and CTA 20. RR 48, as shown, is also coupled to PSS 46 and to the network between STA 22 and CTA 20.

It should be understood that some or all of the elements of CTA 20 and/or STA 22 may be integrated within CTA 20 or STA 22, such that explicit connections between the elements are not needed, but a logical coupling would still exist. For example, CTA 20 might be implemented entirely as a single program with data memory, program memory and a processor, with the program memory containing instructions for implementing the client proxy, the TT, the $TT^{-1}$ and the RR, when such instructions are executed by the processor. In such an implementation, the data memory could be logically partitioned to hold variables needed for the processor execution of the instructions, state of the client proxy, TT, $TT^{-1}$ and RR, as well as the contents of the PSS. The same could be true of STA 22.

The PSS can be a disk subsystem, a memory subsystem, or portions thereof. The PSS can also be a memory subsystem with disk backing store, a database server, a database, etc.

Of the connections shown, arrows indicate the most common direction or directions of flow of information, but information could flow in additional directions and information flow in a single direction might involve data flowing in the reverse direction as well. For example, TT 32 generally sends information in the direction of $TT^{-1}$ 44, but data such as confirmations, handshakes, etc., may flow from $TT^{-1}$ 44 to TT 32.

Some of the connections are shown as dotted lines spanning between CTA 20 and STA 22 (e.g., between the TT's and $TT^{-1}$'s and the RR's). Although they are shown by separate lines, it should be understood that these lines can represent distinct network connections, or separate packet flows over a common network connection, or even shared packets among the logical connection shown. Thus, dotted line connections might be independent connections comprising more than one port number and/or more than one IP address, but they might also be three logical connections over one packet-switched connection, such as via a common path using common port numbers and common IP addresses.

The undotted lines between the client and the CTA and the server and STA are labeled as "LAN/direct" to indicate that those connections are likely higher performance (latency, bandwidth, reliability, etc.) than the connections between the TA's labeled "Internet/WAN/etc." Examples of the former include LANs, cables, motherboards, CPU busses, etc. The system is still operable if the connections between the TA's are higher performance connections, but some of the benefits of transaction acceleration might not be seen.

In operation, the CTA's and STA's examine the payloads of their transactions where warranted and store/cache strings or other sequences of data ("segments") derived from those payloads using a unique naming scheme that can be independent of the transaction. When sending the payload from one TA to another, the TA may replace the segment data with references to the segment data. One indication that this replacement should occur is when the segment data is such that the sender can expect that the receiver would have that uniquely named segment data, either because it appeared in an earlier transaction or was sent through other processes to the receiver, however other indications or no indication may be used to determine whether or not to replace the segment data with a reference. In some cases segmentation and substitution will not be performed where acceleration is not expected, such as where the amount of data involved is small. The segmented portions of the transaction can be any portion of the data sent, so long as the transaction is still identifiable at the receiving end enough to be reconstructed.

Because the segments can be uniquely named and the names can be independent of the transaction, a segment appearing in one transaction can be stored at both TA's and used for accelerating other transactions. For example, where a client initiates a number of file request transactions, if the files have data in common, that common data might be formed as a segment and after the first such segment is transmitted, all further requests for files with the common data would have a segment reference substituted for the common data, to be replaced by the CTA before sending the reconstructed file to the client making the request. Similarly, where one CTA handles more than one client, the segments for one client can be used for another client.

Where the transactions are other than file transactions, analogous acceleration is possible. For example, where a CTA is coupled to an e-mail client and an STA is coupled to an e-mail server, an e-mail attachment that many clients are requesting via the CTA can be represented as a segment after the CTA has obtained the contents of the attachment and then each subsequent time a client requests the attachment, the responding STA will replace the attachment with the segment reference and the receiving CTA will replace the reference with the stored attachment. Since the attachment is stored as a segment independent of the transaction, the same segment data might be found in a file transaction, additional e-mail transactions or other transactions, and in each case, the sender replaces the data with the segment reference and the receiver replaces the segment reference with the segment data.

Note that there are several advantages of such an approach. Unlike caching, where a transaction result is cached and reused when that transaction is repeated and the cache is not invalidated, a segment can be used in several unrelated transactions and segments need not be bounded at arbitrary cut points. Since segment names and content can be independent of any particular bit stream or transaction, they can survive in the persistent storage for arbitrary amounts of time, even if system components crash and reboot, new components are added into the mix, the segment store is erased, etc.

The receiver can obtain the segment data for inclusion in its persistent store and/or for decoding before, during or after receiving the transmission of a sequence of references from the sender. Preferably, the segment data is obtained in ways that improve the responsiveness of the transaction, when possible. For example, if a need for a segment can be anticipated, the segment data can be sent before it is needed, so that when it is needed, it can be obtained faster. However, in some cases, such as where a receiving TA does not have any stored segments and has to obtain all of them during the transaction, transaction acceleration might not occur since the total amount of data that needs to be sent is not reduced.

Assuming a request flows through the TA's, client 12 would send the request to client proxy 30, which would then send it to TT 32, either modifying the request or merely forwarding it. TT 32 determines how to transform the request, storing segments and references thereto in PSS 36 as needed (explained in more detail below), and sends the transformed or unmodified request to $TT^{-1}$ 44, which performs any needed inverse transformations (explained in more detail below) and sends the request to server proxy 40, and in turn to server 14. An analogous path is taken for the response.

Where a message (such as a client request message or a server response message) has been transformed, the inverse transaction transformer uses the contents of its PSS to reconstruct the message. In a simple case, the TT for a sender (client or server) transforms a message by identifying segments of the message, replacing identified segments with references and storing the reference-segment pairs in the PSS. Some techniques for intelligently segmenting data based on content are described in McCanne II. By sending references instead of segment data, the total traffic between TA's during the transaction is reduced, or perhaps the bulk of the traffic is moved to a less critical time or less critical path.

Where the receiving TA has in its PSS the reference-segment pairs used by the sending TT, the receiving $TT^{-1}$ can regenerate the sent data by replacing the references with their corresponding segment data. The receiving TA can obtain segment data for storage in its PSS from a side channel or as part of the traffic from the sending TA. Thus, the data transmitted from the sending TA to the receiving TA may include both references to segments and also "bindings" representing the mapping from a reference to the segment data. Of course, if each time a segment is replaced with a reference and both the reference and the binding are sent, not much bandwidth will be saved, and in fact the bandwidth will be increased. However, where the sender suspects the receiver already has the binding, the sender can omit the bindings, resulting in substantially less traffic. Note that exact knowledge of what the receiver has is not required to achieve the benefits from this process.

In some cases, all of the data needed to fulfill a request is present at the client's PSS, so that if a caching scheme were used instead, with the PSS as the cache, no message would need to be sent to the server at all. However, this would require that the CTA be sufficiently intelligent enough to understand the client transaction and construct a proper response from the data that is present in the PSS. This is a difficult problem in general, especially when many different application types and client-server scenarios are proxied through the CTA and certain client-server interactions simply are not amenable to caching (e.g., file system write operations, database update transactions, file deletion, etc). Thus, it is preferable to use the TA's described here and for the messages to be sent to the server anyway, so that the inconsistencies of caching schemes can be avoided. For example, if a file server receives all the requests for a file, even if the entire file content is present at the client, the server can track requests and the server can implement complex operations such as file locking protocols even though no substantial file data need be transmitted across the network.

In preferred embodiments of the TA system, the above benefits accrue automatically. For example, the STA segments each transaction payload and replaces segments with references. For the segment data the STA suspects the CTA has, the STA uses the references that it knows the CTA has for those segments. When data changes at the server, rather than trying to modify the existing segments in the PSS, the STA creates new segments representing the changed data and can assume that the CTA does not have those segments. In this case, the STA uses new references to the new segments representing the changed data. At the receiving TA (the CTA, in this example), the references to older data might be resolved from bindings stored in the receiver's PSS, but for the new, changed segments, the references are resolved from bindings included in the stream from the sender. Those bindings can then be stored by the receiver's $TT^{-1}$ into the receiver's PSS, so that they are available for later transformations by that receiver.

In addition, because references are globally unique (as described below), they can be used by any TA in the network, not just the STA and CTA pair as described in this example. For example, the CTA might communicate with a different STA and use a reference allocated by the former STA. If the two STA's communicate in the future, they immediately enjoy the benefit of the segment binding that has been disseminated to both devices.

Several schemes are usable to ensure that each named segment has a unique name throughout the system at any given time (i.e., that no two segments with different data are erroneously assigned the same name). In one approach, every segment reference is generated as a large random number, where the number of unique references is much lower than the space of all possible large random numbers. This scheme is less than desirable because a small possibility exists that two segments will have the same segment reference but different segment data, which would cause a receiving TA to erroneously reconstruct a message with the wrong data.

Another scheme is to generate hashes from the segment data so that each segment reference is a hash of the segment data and different segment data will result in different hashes, except in very rare cases. Yet again, the rare cases will always be problematic, as long as two degenerate segments with the same reference but different segment data exist in the system. Unlike the random number case, this problem will recur every time that particular data pattern exists in the data stream.

One simple approach that avoids the above problems is for each sending TA to generate a segment reference from the combination of a unique ID (such as the host IP address, when globally unique IP addresses are used throughout the network, the host MAC address, an assigned unique identifier, or other means) and a sequential number. In most implementations, the maximum number of unique sequential numbers is bounded, and thus will eventually need to be reused. However, a name space can be made effectively unbounded by using a large enough label number space that the supply could last millions of years and no special handling would be needed. The large labels could be compressed to provide for small footprints for the labels.

Since labels will be allocated sequentially and because the corresponding segments will often appear in the same sequence, very good compression of the labels can be achieved in practice (not just across the network but also in the data structures that represent strings of labels that are invariably employed throughout the system). Additional compression is also possible on the sending TA's output stream. For example, where the receiving TA can identify the sending TA and the sending TA's references include the sending TA's unique ID, that ID need not appear in the sent data, as the receiving TA would know what ID to use in forming the references (although, in general, extra information must be communicated when a sending TA references not just its own bindings but bindings and labels that originate from other TA's). One other advantage of this approach is that a TA can identify the source of each of the segments in its PSS from the ID component of the segment reference, for use in statistical analysis, diagnostics, and the like.

In a system where the labels are intended to be reused during the expected lifetime of the system, the system preferably includes a mechanism to "expire" a reference binding, with this expiration being propagated to all TA's in a network. One approach is to timestamp each segment, so that it has a fixed lifetime that can easily be inferred by each component in the system that uses the segment. If time stamps are assigned to labels in a coarse-grained fashion (e.g., the timestamp changes just once a day), then label compression eliminates most of the protocol header associated with assigning and communicating timestamps. A TA can thereby infer when it is safe to reuse a particular set of labels.

Yet another alternative for managing the segment name space is to have central allocation of unique references. In such cases, a sending TA would request a reference, or a block of references, from a source that guarantees that the references are unique. In addition, each allocation could be assigned a maximum time-to-live so that the allocation of references, or blocks of references, could be implicitly reused.

It may happen that a sending TA assumes a certain binding is present at a receiving TA when it is not. This might occur where the receiving TA has a PSS overflow, corruption, loss of power, etc., or the receiving TA intentionally removed the binding. In such cases, the receiving TA can obtain the segment data without aborting or having to report the transaction as a failure. This allows the system to gracefully deal with missing data due to a disk getting full, disk failure, network failure, system crash, etc. If a sending TA assumes that a receiving TA has a binding, the sending TA will send a message using that binding's reference, but will not include the segment data of the binding. When the receiving $TT^{-1}$ tries to resolve the reference, it will fail. In those cases, the receiving $TT^{-1}$ sends a resolution request to its RR, which then makes a request to the sender's RR. The $TT^{-1}$ can just block and restart when the needed data is received, perhaps due to an event trigger signaling that the data is available; this process could be transparent to the $TT^{-1}$ (other than a delay in getting a response). Once the segment data is received at the receiver, the receiver's RR can either provide the data to the receiver's $TT^{-1}$ or just put it in the receiver's PSS, where it can be accessed by the receiver's $TT^{-1}$. As the sender's TT adds bindings to its PSS as appropriate, it maintains those bindings for a guaranteed minimum amount of time; as such when it is replacing segment data with references, it can be guaranteed that when the receiver's RR makes a request of the sender's RR for that segment data, it will be present in the sender's PSS, provided the guaranteed "lifetime" of a segment at the sender is greater than the maximum amount of time the receiver might require to make a segment request.

FIG. 3 contains an illustration of data organization of a bindings table of a simple PSS. As shown there, the bindings table stores a plurality of bindings, such as $(R_1,S_1)$, $(R_2,S_2)$, etc., where $R_i$ is the reference label for the i-th binding and $S_i$ is the segment data for the i-th binding. A timestamp for each binding might be used for aging the bindings. The binding records might include other fields not shown in FIG. 3, such as those listed in Table 1 and/or similar or additional fields, possibly in addition to other tables, data structures, objects and/or code.

TABLE 1 number of times accessed
last access time
last modify time
lifetime
encoding method identifier (e.g., unencoded raw data, run-length encoded, MD5 encoded, encrypted)
fingerprint
error correction data (if not interspersed with segment data)
indication of the sender that created the binding (the binding "owner")
creation time (useful for timing out segments, such as by using the lifetime field)
other fields Some additional data structures might include an index of references, an index of other fields, an index of segments, etc., for searching or otherwise processing the contents of the PSS. Segments could be indexed in many ways that could be useful for the encoding process, but one embodiment builds an index of segments where a well-known hash, computed over all of the data that comprises the segment, is used as the key. If the encoding method identifier is used, segment data can be encoded for error correction, encryption, etc.

For some segment data, it might be suitable to compress the segment data to reduce the storage needs of the PSS and the transmission overhead needed to pass bindings around. In some cases, the encoding method is fixed and known, so the encoding method identifier is not needed. For example, rather than transmitting and caching verbatim segments (i.e., segments that literally represent substrings or subsequences of the transaction data), the sending TA can transmit invertible functions of the segments, e.g., forward error correction encoded blocks of segments, encryptions of segments, signatures of segments, or the like. This would allow the receiving TA to decode different segments from a common pool of properly-encoded data, where if certain portions of the encoded data were lost or corrupted, the original segments can still be reconstructed, thus adding error-correction to the link without requiring changes at the clients or servers.

Other fields might be present in the PSS for tracking which segments might be known by which recipients. In some implementations, the sender just segments data and creates references independent of what the receiver might be able to do with the results, but in other implementations, a sender maintains information usable to determine whether a receiver might have a particular binding, such as by tracking which receivers previously received which segments. Storage for such information could be optimized by recording which receiver(s) have which segment(s) in a Bloom filter (i.e., a bit vector indexed by the hash of the destination into the vector giving a rare false positive but never giving a false negative).

Some implementations might use a heuristic such that a server proxy includes a segment binding only when it creates a new entry and other client proxies that need the segment will have to request it, as only the first client proxy will get the binding for the new segment automatically.

A TA might include routines for PSS housecleaning, such as a heuristic that says to delete all segments in a client-side PSS related to a particular file on a particular server when the client closes the file. The server-side PSS might also delete the corresponding segments, or defer the housecleaning for those segments until all clients close the file. Other housecleaning might involve deleting segment entries that have exceeded their lifetimes or have not been used for a while.

Other heuristics might indicate when a particular segment binding is to be used and discarded.

The arrangement of the PSS has a number of benefits, some of which should be apparent upon reading this disclosure. Because segmentation can occur at varying cut points and the segments can be independent of the transactions, the segments might survive in the PSS for arbitrary lengths of time and be used for transactions entirely unrelated to the transaction in which the segment was created and stored. Because the segment references are unique for unique segment data, a recipient can always identify correctly the segment data for a segment reference (if the recipient has the segment). This is better than merely caching results. It is also an improvement over compression with localized signal statistics, such as building adaptive codebooks and the like. Segment names and content are independent of any particular bit stream, even if system components crash and reboot, new components are added into the mix, the persistent segment store is erased, etc. It should be understood that "persistent" as used to describe the PSS does not mean that the segments are permanently stored and can therefore never be purged; just that at least some of the segments persist at least beyond one transaction.

FIG. 4 illustrates an encoder 140 and a PSS 142. The TT for a TA might be just encoder 140, but the TT might also include other functionality or elements. As shown, encoder 140 has an input for data to be encoded, and control inputs for encoding control parameters and out-of-band information about the input data. Encoder 140 is shown with outputs for encoded data and segment bindings for storage in PSS 142. In operation, encoder 140 would process input data, identify segments of data, replace the segment's data with a reference, provide the segment data and a segment reference to PSS 142 in the form of a binding, and output the encoded data. As shown in FIG. 4, the resulting encoded data might comprise references, bindings and residual data (such as data that could not be efficiently represented with references). Herein, a piece of residual data is also referred to as an "unreferenced segment". In some embodiments, a distinction exists between data that is segmented but not referenced and data which is not segmented. In the former, there is a defined segment beginning and end, but the segment contents are not replaced with a segment reference, whereas in the latter, there might not be a segment beginning or end, as such. For simplicity of the following description, the distinction is ignored.

Another output of encoder 140 is the segment bindings, for PSS 142 for use in decoding incoming data (or for supplying to other TA's on request). Control inputs to encoder 140 might include a target segment size and out-of-band information might include parameters indicating such things as the default lifetime of segments, information about the data source, etc. The target segment size is a parameter that controls the average size of segments generated by the segmentation process. In general, segments vary in length with a certain distribution of sizes, and the target segment size controls the average such size generated by the segmentation process. While segment size could be fixed, it is preferable that the segment size be allowed to vary, so that segments match up more often than if the data handled by the system is segmented into arbitrary fixed segments.

The TT puts the bindings it creates in its own PSS for use in decoding, but also so that the "owner" of the binding (i.e., the TA that created the binding) can keep track of it, supply it to others and also refer to it when later data is encoded (so that segment references might be reused where the segment data repeats).

The $TT_{-1}$ of the owner of a binding will often re-use those bindings, such as when a sequence of segment data goes round trip, i.e., flows from the STA to the CTA and back, or vice versa. This might happen, for example, where a user edits a file. The user's file client will request file data, the server will serve the file and while the user edits the file, the bindings for the file data will be present in both the CTA's PSS and the STA's PSS. If the user writes back the file data, the portions that did not change may be fully represented by reference labels created when the file data was first sent to the user's client. In this case, rather than create new bindings when sending data back to the STA, the CTA simply references the old bindings that were created by that same STA. Other examples include e-mail, where a client might request an e-mail (via one protocol like IMAP or POP) and then forward it back over the network (via another protocol like SMTP), in which case the STA's $TT^{-1}$ can use bindings created by the STA's TT when the e-mail was first sent to the client, presuming both SMTP transactions and IMAP or POP transactions flow through the STA/CTA pair. Another example is where a user copies information from a Web site (via HTTP) to a file system via CIFS, presuming both HTTP transactions and CIFS transaction flow through the STA/CTA pair.

Because of this characteristic of the PSS, a client and a server can effectively send large blocks of data back and forth, using very little bandwidth and without changing the client or the server. This is particularly useful where large files are moved around and only changed slightly, such as where two or more users are collaborating on a large CAD file. Using the systems shown here, network performance could be sufficient to cause users to abandon other workarounds to network bottlenecks, such as remote access, storing local copies of files, pushing out read-only copies of the files, etc.

If the input data is segmented according to content, the same sequence of bits would likely result in the same segment, regardless of where the sequence of bits occurred. This has advantages, as repeated bit sequences are effectively noticed and referenced. However, where there is a compelling need or improved performance, external factors might come into play. For example, some parameters about the transactions could be used, possibly resulting in more than one segment being created for one sequence of bits, if there were an offsetting benefit. In one approach, an external factor is what segments exist in the PSS, and segments boundaries are decided on based on what segments are already present in the PSS. While this is not as scalable as the more basic approach described above, it might result in more reuse of segments and therefore have some benefits.

This can be illustrated by an example. If a payload were normally cut one way, but a different set of cuts would more closely match segments that are already in the PSS, greater compression would result. However, to be able to keep the gains, the sending TA would have to have some idea which segments the receiving TA probably has, so that the sending TA does not make its cuts based on the sender's PSS if the sender knows that most of the sender's PSS segments are not present at the receiver's PSS.

FIG. 5 illustrates a decoder 150 and a PSS 152. The $TT^{-1}$ for a TA might be just decoder 150, but the $TT^{-1}$ might also include other functionality or elements. Decoder 150 receives encoded data, as might have been output by decoder 140 shown in FIG. 4. As described above, the encoded data might comprise references, bindings and residual data.

When decoder 150 encounters a binding in data it receives, it can use the segment data in that binding to reconstruct the original data and it can also store the binding in its PSS. When decoder 150 encounters a reference without a binding, it can use the reference to obtain segment data from PSS 152 to reconstruct the segment. If the segment reference is not found in PSS 152, decoder 150 can send a request for the segment data.

Figure 6:
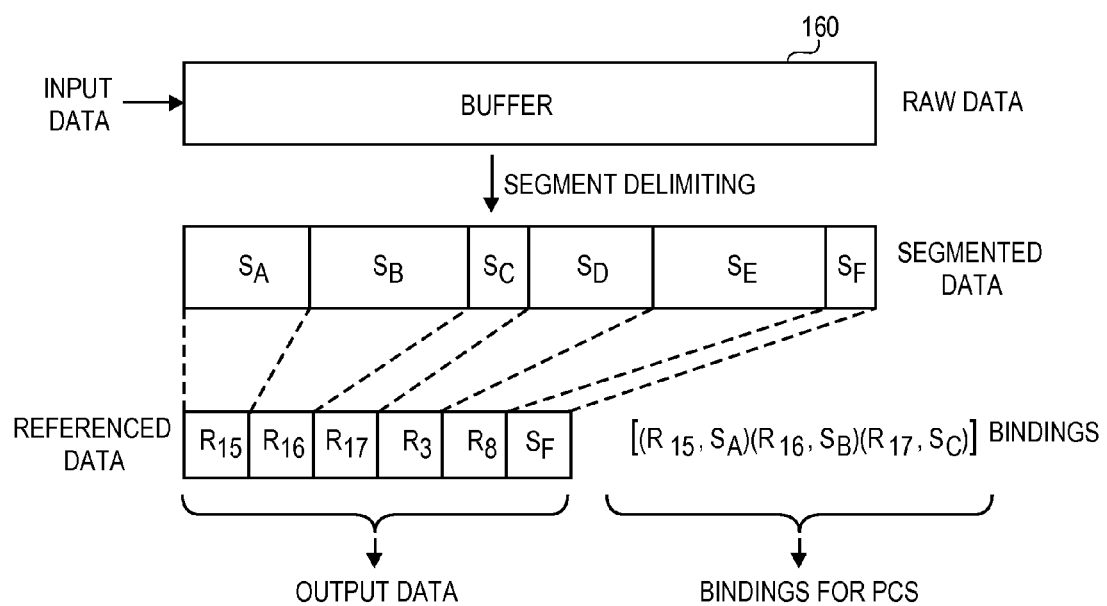
FIG. 6 is an illustration of an encoding process wherein input data is segmented and represented by references to data segments.

FIG. 6 is an illustration of an encoding process wherein input data is segmented and represented by references to data segments. As shown there, the raw input data is loaded into a buffer 160 (although this can be done without buffering, if necessary). The raw input data is then segmented into segments. Several techniques are available for determining where to define the "cut lines" that separate each segment from its adjacent neighbors. Some approaches to segmentation as described in McCanne II. Other approaches that might be used are a simple approach of putting cut lines at regular intervals, or in some relation to a fixed sequence of data found in the raw input data, such as end-of-line marks, though such approaches might not lead to the best performing segmentation scheme.

However the cut lines are determined, in the example of FIG. 6, the raw input data in buffer 160 is segmented into segments $S_A$, $S_B$, $S_C$, $S_D$, $S_E$ and $S_F$. In this example, the first five segments are to be replaced with references and the references happen to be $R_{15}$, $R_{16}$, $R_{17}$, $R_3$ and $R_8$. Note that the references are not necessarily in order, and this example illustrates that some references (e.g., $R_3$ and $R_8$) might be to segment data that was already encountered, in which case a new segment is not used, but the reference is to the preexisting segment. Also illustrated here is that a segment (e.g., $S_F$) need not be replaced with a reference.

The raw input data can be fully represented by the output data and the bindings, which can be generated from the raw input data. The bindings are provided to the PSS for the TA that generated the bindings, as well as others and some or all of the bindings might be sent as part of the output data. In this example, the new bindings are $(R_{15}, S_A)$, $(R_{16}, S_B)$ and $(R_{17}, S_C)$. In this example, the bindings $(R_3, S_D)$ and $(R_8, S_E)$ are not needed because the segment data for segments $S_D$ and $S_E$ are already known and were stored with references to $R_3$ and $R_8$.

Figure 7:
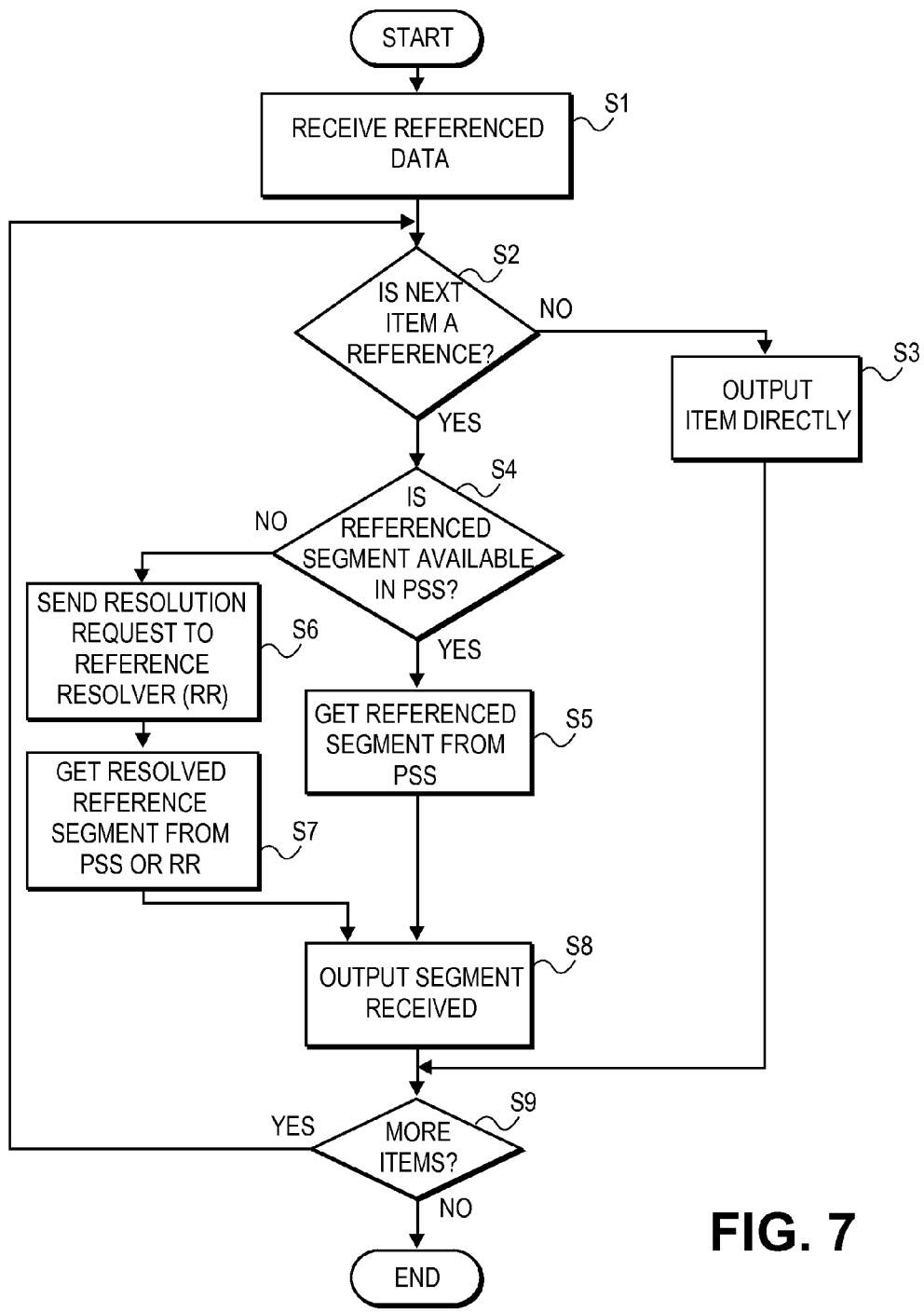
FIG. 7 is a flowchart illustrating a process for decoding data as might be output by the encoder of FIG. 4.

FIG. 7 is a flowchart illustrating a process for decoding data as might be output by the encoder of FIG. 4 and decoded by the decoder of FIG. 5. The steps of the process are labeled "S1, "S2", etc., with the steps generally proceeding in order unless otherwise indicated. In the first step (S1) referenced data (e.g., data encoded with references) is received and parsed into tokens. If the token is checked (S2) and it is not a reference, it must be an unreferenced segment and so the token is output directly (S3). However, if the token is a reference, the decoder checks (S4) if the reference exists in the PSS supporting the decoder. If yes, the decoder gets the referenced segment from the PSS (S5). If no, the decoder sends a resolution request (S6) to the reference resolver supporting the decoder and receives the resolved referenced segment back from the reference resolver (S7). Where the reference label encodes the source of the segment data, that label may be used by the reference resolver to aid in finding the referenced segment.

Once the decoder has access to the referenced segment's segment data (either following step S3 or step S7), it outputs the segment data (S8). The decoder then checks for additional tokens (S9). If there are more tokens, the process repeats at step S2 with the next token, otherwise the process completes.

The above description represents just one particular embodiment for encoding and decoding segment bindings and references using a PSS. Other approaches are possible that involve more sophisticated representations of the relationships between labels and data, such as those shown in McCanne II.

Figure 8:
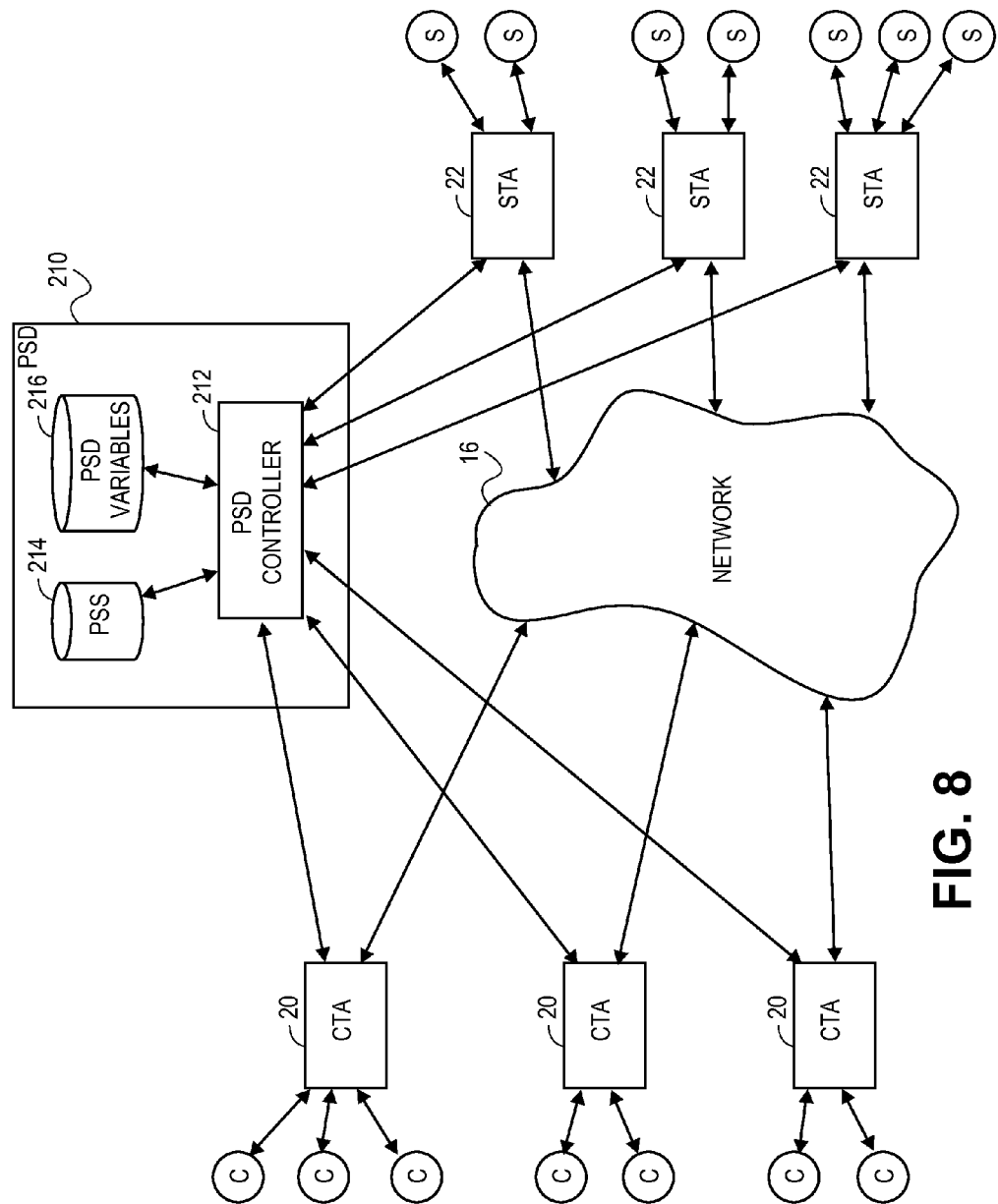
FIG. 8 is a block diagram of a networked system wherein transaction acceleration is implemented and uses a proactive segment distributor ("PSD").

FIG. 8 is a block diagram of a networked system wherein transaction acceleration is implemented and uses a proactive segment distributor ("PSD"). As shown there, a PSD 210 includes a PSD controller 212, its own PSS 214 and other storage 216 for PSD variables. In some implementations, multiple PSD's are used, although only one is shown in the FIG.

By the operation of PSD 210, segments are more likely to be present when they are needed and therefore fewer segment resolution requests are needed. Where the segments need to be moved from PSS to PSS, PSD 210 can trigger this process in advance of the actual need for the segment, so that a transaction will return more quickly, as the receiving TA does not have to block for the receiving TA to issue a request for a segment to the sending TA as the payload is being received. PSD 210 can do the distributing itself or just direct the owner (or other holder) of segments to pass them around. In some instances, PSD 210 might maintain its own PSS 214, but in some implementations, the PSD just directs the flow of bindings among PSS's and does not maintain its own PSS.

PSD 210 might monitor transaction flow from the CTA's 20 and STA's 22 and from that, determine which segments are likely to be needed and where. When PSD 210 determines that a segment might be needed, it can send a message to the sending TA, such as an STA serving a file system or e-mail system. The message would direct the sending TA to perform segmentation, store bindings in its own PSS and even propagate the bindings to other PSS's, so that the segmentation is done when the sending TA receives a message that would result in the sending TA sending a payload. When done well, a receiving TA will obtain the binding it needs for when the receiving TA receives a payload with references therein and those bindings can be sent when the bandwidth is not so critical. More typically, the sending TA is an STA, but the PSD might also direct CTA's to "pre-load" bindings into the system.

In some cases, server agents are added to servers to identify candidates for preloading. For example, a mail server such as a Microsoft Exchange™ server might be coupled to a network and operate with an STA and an associated server agent. The server agent would detect when e-mails and attachments arrive and, based on past observations or operator policies, pre-load a particular CTA with the relevant segment data. This might be done by tracking which users read their emails from which locations, either through static configuration or preferably with measurements. Then, when a remote user goes to read e-mail, the bulk of the email data is already at the user's remote site, but the transactions still go back the Exchange mail server to ensure protocol correctness.

In addition to proactively triggering segment generation, PSD 210 might also assist with "pre-populating" various TA PSS's with bindings that already exist so that those TA's have segment data ready when a reference is received. In one implementation, PSD 210 operates on a propagation model, as is done with USENET news items, where new bindings are noticed to PSD 210 and PSD 210 then propagates the new bindings from the noticing TA to all or some of the other TA's, which might in turn propagate bindings. In lieu of, or in addition to the pre-populating triggered by the PSD, a sending TA might anticipate which segments need to be transmitted to a receiving TA and send them either ahead of time or "out-of-band") such that the receiving TA need not issue additional requests to resolve unknown segments.

Where indiscriminate propagation would likely lead to network overload or increased bandwidth usage relative to just sending complete, raw data for each transaction, more sophisticated approaches might be used. In an example of a more efficient approach, the PSD uses heuristics to determine which TA's might need which segments. In another approach, servers include server agents that provide the PSD with information at a high level that allows the PSD to determine which CTA's will need which segments from the "agented" server. In some embodiments, combinations of the above approaches are used.

Another embodiment of a PSD with a server agent involves a type of file system mirroring. Here, the server agent monitors file system activity and whenever new data is written to the file system, the agent instructs the PSD to replicate the appropriate segment bindings to one or more CTA's. User- or operator-defined policies could dictate whether the entire file system's data is replicated or just configured portions are replicated. Moreover, these policies could be augmented by measurements of access patterns, so that segment data from the most frequently accessed portions of the file system are replicated (and these measurements could be performed on a per-CTA basis). As a result, each such CTA effectively contains a mirror of all (or portions) of the file system data. Then, when clients interact with the CTA via network file-system protocols (like CIFS or NFS), the transactions flow all the way back to the origin file server, yet these transactions are wholly compressed into pure strings of references. This approach ensures that the original file system semantics are preserved as if all clients were sharing a single file server, yet the performance of the client-server communication behaves as if all data were in local per-client file servers.

While the segmentation scheme outlined above can significantly reduce the bandwidth requirements of client-server communication, the transactions are still subject to the inherent latency of communications across the wide area. These latency bottlenecks can adversely impact performance and can be dealt with using complementary techniques like file read-ahead and write-behind. Because of the compression and staging of data, however, read-ahead and write-behind techniques become extremely effective as they incur very little overhead on the network since all the data is already present at the CTA.

All of these approaches can be complemented with a scheme to employ bandwidth policies to the various sorts of CTA/STA communication. For example, a certain bandwidth limit could be imposed on the PSD to limit the aggressiveness of the staging algorithms. In another example, bandwidth priorities could be applied to different classes of staged data (e.g., file system segment replication could have priority over email attachment segment replication).

Figure 9:
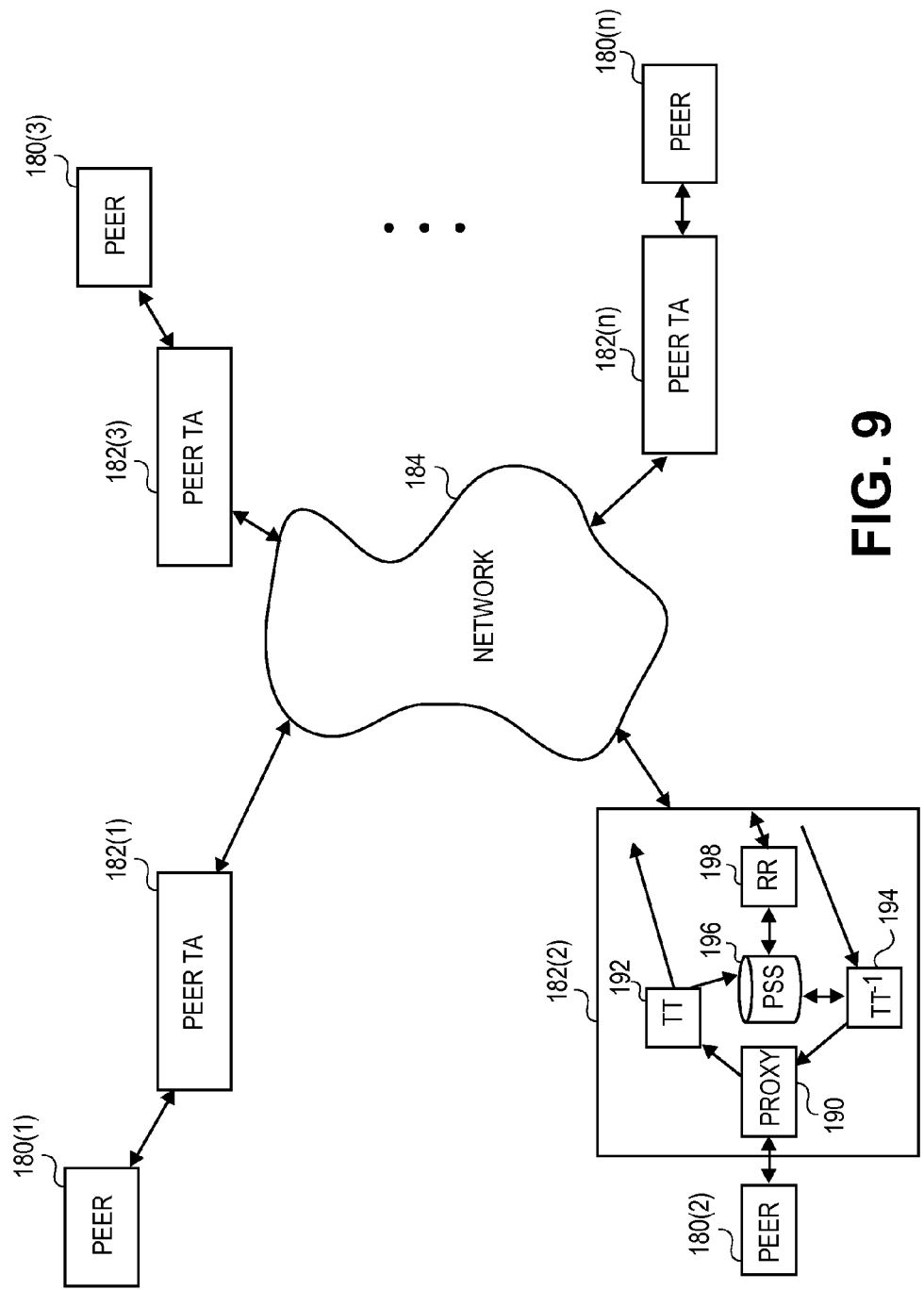
FIG. 9 is a block diagram of a networked peer-to-peer system according to embodiments of the present invention.

FIG. 9 is a block diagram of a networked peer-to-peer system according to embodiments of the present invention. As shown there, various peers 180 interact with each other via peer transaction accelerators (PTA's) 182. Peers 180 might interact directly, although such connections are not shown. In operation, one peer 180 might request data from another peer, via each peer's PTA 182 and network 184. As shown, each PTA 182 might comprise a peer proxy 190, a TT 192, a $TT_{-1}$ 194, a PSS 196 and an RR 198. In a peer to peer system, a peer is essentially functioning as a client for some transactions and a server for other transactions, and so the transaction acceleration scheme would function in an analogous manner.

Figure 10:
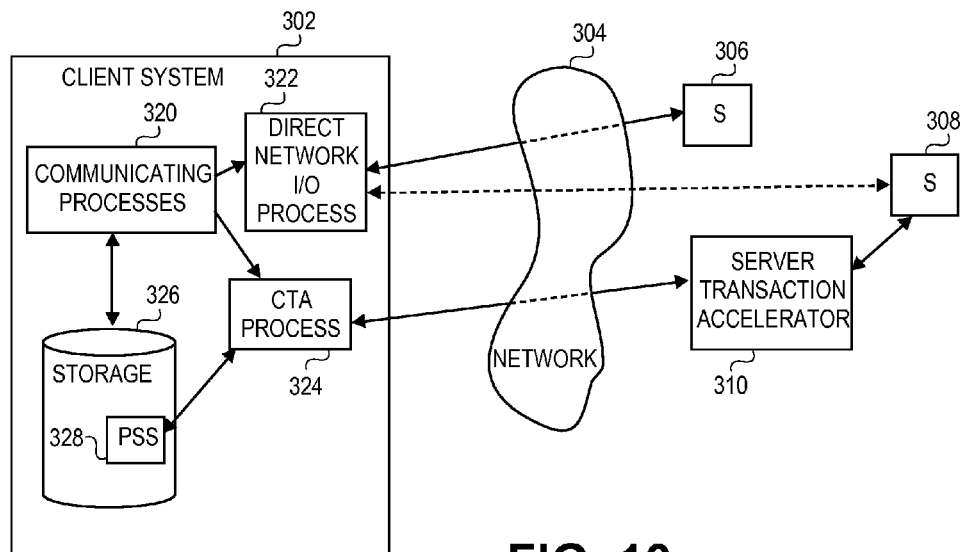
FIG. 10 is a block diagram of a networked system wherein transaction acceleration is implemented and the client-side transaction accelerator is integrated in with the client.

FIG. 10 is a block diagram of a networked system wherein transaction acceleration is implemented and the client-side transaction accelerator is integrated in with the client as opposed to being a separate entity. As shown, a client system 302 is coupled through a network 304 to a server 306 directly and a server 308 via a server transaction accelerator STA 310. Client system 302 is shown including communicating processes 320, a direct network I/O process 322, a CTA process 324, and storage 326 including a persistent segment store 328. Communicating processes 320 are coupled with direct network I/O process 322, CTA process 324 and storage 326. CTA process 324 is coupled to PSS 328.

In operation, communicating processes 320 perform functions, typically at the application layer, that require interaction with servers outside client system 302. For example, communicating processes might comprise a web browser, an e-mail client, a Java program, and interactive network program, a chat program, an FTP program, etc. Where a communicating process is to interact with a server directly, the communicating process will interact with direct network I/O process 322 to interact with a server, but where the transaction is to be accelerated, the communicating process would interact with CTA 324. In some embodiments, a communicating process 320 and a CTA 324 may be components of a single application program, while in other embodiments they may be separate application processes. CTA process 324 can accelerate transactions much like the various stand-alone CTA's do as described above, using a portion of storage 326 as the PSS. In some variations, PSS 328 is distinct memory from storage 326, which is used for other processes in client system 302, such as the needs of the communicating processes 320.

Direct network I/O process 322 satisfies the network I/O needs of communicating processes 302 by interacting with servers over network 304. In some cases, direct network I/O process 322 interacts with the same servers as CTA 324, illustrated by the dotted line to server 308. Client system 302 might include other processes not shown, including processes related to transaction acceleration. For example, communicating processes 320 might rely on a separate process that determines when to send a transaction directly to a server and when to attempt to accelerate it.

Figure 11:
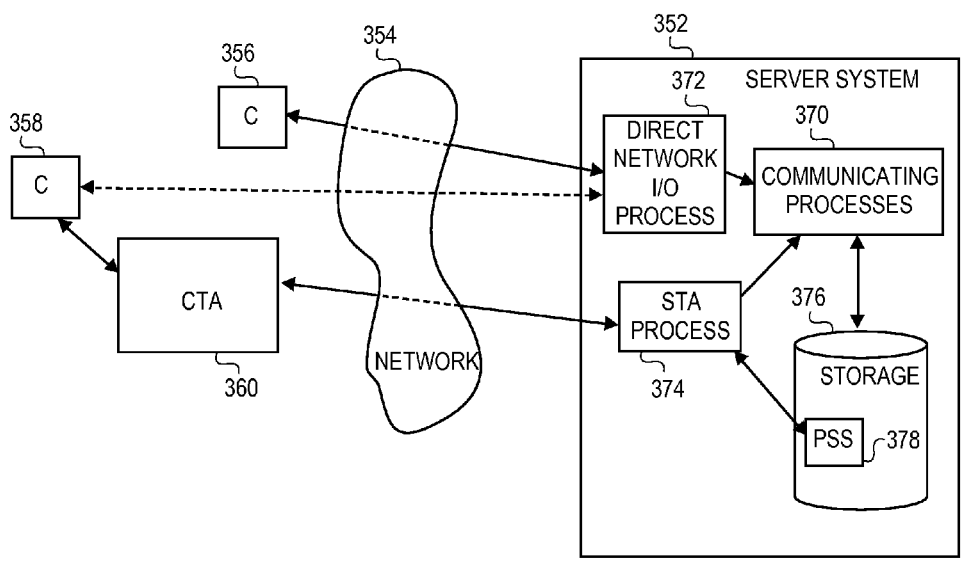
FIG. 11 is a block diagram of a networked system wherein transaction acceleration is implemented and the server-side transaction accelerator is integrated in with the server.

FIG. 11 is a block diagram of a networked system wherein transaction acceleration is implemented and the server-side transaction accelerator is integrated in with the server. That figures shows a server system 352, a network 354, a client 356, a client 358 and a client transaction accelerator (CTA) 360. Server system 352 is shown including communicating processes 370, a direct network I/O process 372, an STA process 374, and storage 376 including a persistent segment store 378. Communicating processes 370 are coupled with direct network I/O process 372, STA process 374 and storage 376. STA process 374 is coupled to PSS 378. Client 356 couples to a server system 352 directly as illustrated by the line from client 356 to direct network I/O process 372, which handles transactions that do not go through STA process 374. Client 358 couples to server system 352 via CTA 360 and STA process 374, but might also connect directly to direct network I/O process 374 for other transactions.

In operation, communicating processes 370 perform functions such as server processes that respond to requests from clients. Where server system 352 and a client are interacting directly, the transaction would flow between the communicating process and the client via direct network I/O process 372. Where server system 352 and a client are interacting via the TA's, the transaction would flow between the communicating process and the client via STA process 374. STA process 374 can accelerate transactions much like the various stand-alone STA's described above, using a portion of storage 376 as the PSS. In some variations, PSS 378 is distinct memory from storage 376, which is used for other processes in server system 352, such as the needs of the communicating processes 370.

Direct network I/O process 372 satisfies the network I/O needs of communicating processes 352 by interacting with servers over network 354. In some cases, direct network I/O process 372 interacts with the same servers as STA 374, illustrated by the dotted line to client 358. Server system 352 might include other processes not shown, including processes related to transaction acceleration. For example, communicating processes 370 might rely on a separate process that determines when to send a transaction directly to a server and when to attempt to accelerate it.

It should be understood that the elements of FIGS. 10 and 11 could be combined, such that client systems with internal CTA's can communicate with server systems with internal STA's. It should also be understood that where single arrowed lines are used, bi-directional information or data flows might also be present.

One disadvantage of embedding the TA in the client and/or server devices is that each device ends up with its own PSS and the benefits of caching the same segment data on behalf of a large number of clients (or servers) at a given location are diminished. This problem, however, can be overcome in another embodiment that allows the PSS to logically span multiple TA's, preferably situated on a common LAN segment (or a common network area that is interconnected with high-speed links, e.g., a high-speed campus-area network that interconnects multiple floors in a building or multiple buildings in close proximity). In this case, the logical shared PSS can either be another device attached to the network or it can be several PSS's embedded in each CTA such that through cooperative protocols (e.g., over IP Multicast) these PSS's behave as a single, logical entity.

Figure 12:
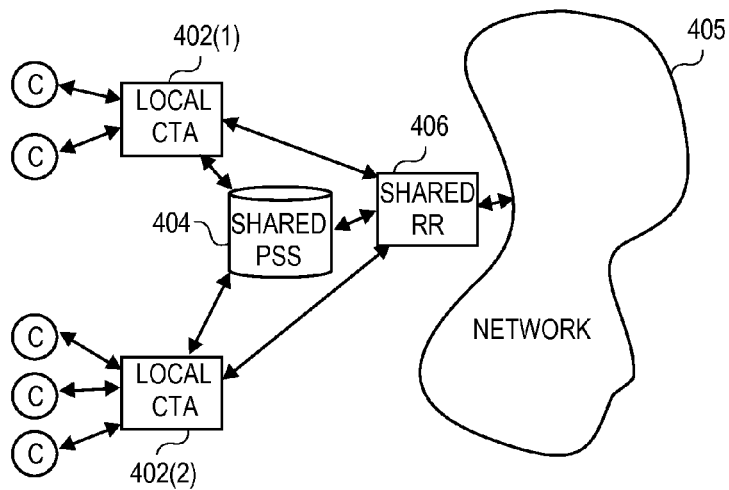
FIG. 12 is a block diagram of a networked system wherein transaction acceleration is implemented and a PSS is shared among a plurality of transaction accelerators.

FIG. 12 is a block diagram of a networked system wherein transaction acceleration is implemented and a PSS is shared among a plurality of transaction accelerators. As shown there, clients couple to a local CTA 402 for transaction acceleration. Instead of maintaining a separate PSS, the local CTA's 402 are coupled to a shared PSS 404. Preferably, the connection between the local CTA's and the shared PSS are higher performance connections relative to the connections via network 405 that would exist between the client and the server. A shared reference resolver 406 might also be present and coupled to the shared PSS 404 and the local CTA's sharing that PSS.

When each local CTA 402 initiates a transaction with a request message or receives a response message, that local CTA 402 would use shared PSS 404 for storage and retrieval of segment data. This has an advantage over a system using separate PSS's for each local CTA, in that a segment that is stored as a result of a transaction for one local CTA could be used in a transaction for another local CTA. For example, if local CTA 402(1) recently handled a transaction for a client that involved getting a data from server S, the segments that server S created for that transaction would likely exist in shared PSS 404. If local CTA 402(2) were to then handle a transaction for a different client (or the same client in some configurations, such as a round-robin local CTA sharing scheme) directed at server S, local CTA 402(2) would send the request to the STA for server S. If the segments for the second transaction match those of the earlier transaction with local CTA 402(1), whether they represent in fact the same request or an unrelated request where the resulting payload data has some data in common, local CTA 402(2) would receive references to those segments instead of the segment data itself.

When a local CTA receives references to segments that cannot be resolved from shared PSS 404, the local CTA can send a request for resolution to shared reference resolver 406. In some embodiments, each local CTA has its own shared reference resolver that communicates its reference resolutions to the shared PSS 404 as well as to other components of the local CTA of which it is a component. Other embodiments may employ a single shared reference resolver used by all clients.

While a shared PSS is described in FIG. 12 as being on the client side, a similar arrangement can be made at the server side, either with shared or individual PSS's on the client sides. Also, TA's with shared PSS's might exist on the same networks as TA's with individual PSS's. Although FIG. 12 shows shared PSS 404 as being distinct from the local CTA's, it may be that the shared PSS is contained within one of the local CTA's, although it is external to other CTA's which share that PSS.

The PSS might be connected among the local CTA's it serves using localized network multicast communication. In this approach, each transaction accelerator subscribes to a well-known and locally scoped multicast group. By using localized scoping, the system can guarantee that only transaction accelerators that are connected by a local high-speed network coordinate with one another through this mechanism. Each host can generate periodic session message packets sent to this group (or another configured group for exchanging session packets), allowing the computation of a round-trip time estimation to other transaction accelerators subscribing to that group. Well-known techniques could be used for this process, such as those shown in Floyd, S., et al., "*A Reliable Multicast Framework for Light-weight Sessions and Application Level Framing*", in IEEE/ACM Transactions on Networking, December 1997, Volume 5, Number 6, pp. 784-803 (hereinafter "Floyd et al."). The session protocol allows all the members in the group to learn of each other's existence and can also infer the size of the group from the sum of members.

Using this multicast configuration, the system for caching segment data can be enhanced in a number of ways. In one approach, whenever a transaction accelerator receives a new segment binding, it can multicast that segment binding to all other transaction accelerators in the locally scoped group. This can mitigate the problems outlined above with each client having a separate PSS, as each PSS in the local set of transaction accelerators would be replicas of each other and any given data segment would thus be sent just once over the WAN connection.

To ensure the reliability of transmission over the network multicast connection, a number of well-known schemes for reliable multicast transport can be employed as in Floyd et al. and papers cited there-in on reliable multicast protocols. Given that this multicast communication is conducted in a homogenous, high-speed local-area or campus-area network, the difficult problems of congestion control and WAN multicast are altogether avoided.

Figure 13:
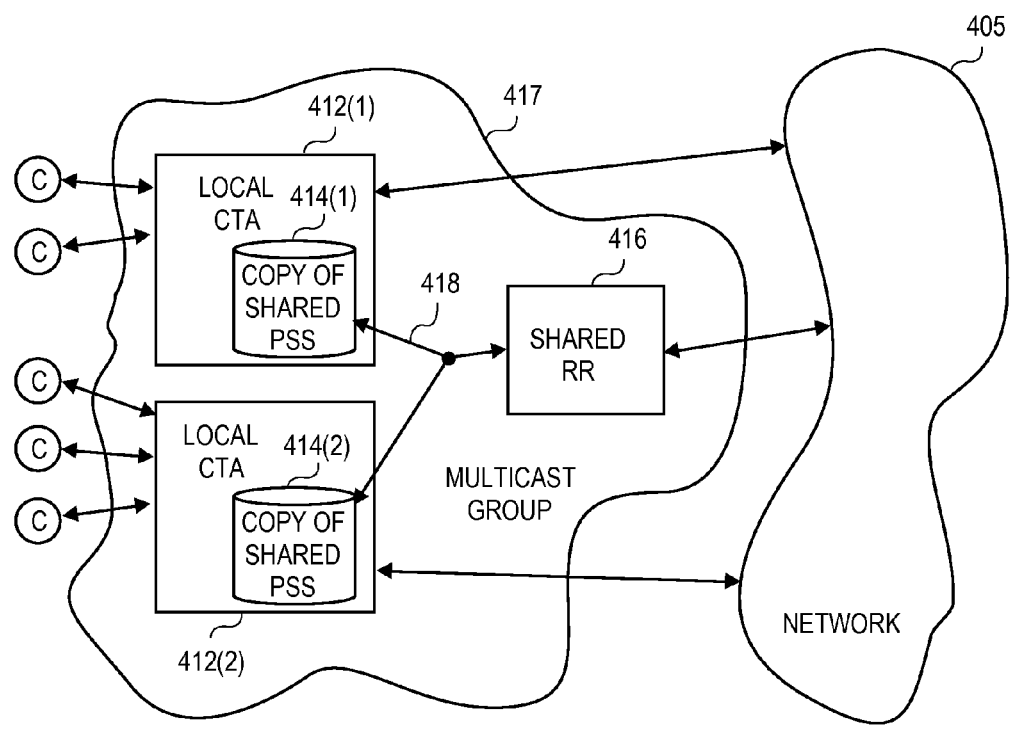
FIG. 13 is a block diagram showing a multicast implementation of the system of FIG. 12, wherein multicast communications are used for updating and reading a shared PSS.

FIG. 13 is a block diagram showing a multicast implementation of the system of FIG. 12, wherein multicast communications are used for updating and reading a shared PSS. As with the arrangement shown in FIG. 12, local CTA's 412 connect to clients and to network 405 and share a shared PSS 414 with other local CTA's. A shared RR 416 is configured to be on the same multicast group 417 as each instance of shared PSS 414 (indicated as 414(1), 414(2), ...). Logically, it might be said that the multicast group contains shared RR 416 and the local CTA's, if the local CTA's handle the I/O needed to read and write the shared PSS. The multicast traffic is illustrated by the lines 418 in the figure.

In another approach, the PSS is not pro-actively replicated as described above, but rather a transaction accelerator can issue local requests to resolve unknown segments. That is, when a transaction accelerator receives a reference for data that it is not in its PSS, it transmits a resolution request message over the locally-scoped multicast group. All of the other local transaction accelerators will thus receive the request message, unless errors occur. A receiver that has the requested data in its PSS can then respond with the data. By using well-known slotting and damping techniques (as in Floyd et al.), just one response message typically will be transmitted over the network while incurring little delay.

If no response is received by the requestor (after some deliberate delay computed from the session message round-trip times), the requestor assumes that the data is not present in the local environment and transmits the resolution request over the WAN to the transaction accelerator that originally generated the data reference in question. Note that since the local round-trip time is comparatively small (typically less than 1 ms) compared to the WAN round-trip time (typically tens of milliseconds or more), the extra delay incurred by this initial check is negligible (i.e., typically under a few percent), while the benefit is substantial due to the higher local network performance.

In yet another approach, a hybrid between the two approaches described above eliminates the delay associated with the local resolution request. In this hybrid approach, whenever a transaction accelerator receives a new segment binding, instead of multicasting the entire segment, it simply multicasts the name of the segment. This way, all the local transaction accelerators learn about what segments are present without necessarily having to hold a copy of all the segment data. Then, when a reference is received for a segment that is not in the PSS but whose name is recorded as locally known, the transaction accelerator can send a local request for the data and that local request can go directly to the transaction accelerator that sent out the new segment binding if the sender can be identified. Otherwise, the accelerator can assume the data is not locally present and immediately send a request across the WAN. Even when the segment is inferred to be locally present, it is possible that it has been flushed from all the other local accelerators' PSS's. In this case, the requesting accelerator will still time out and revert to transmitting its resolution request across the WAN.

In yet another approach, the segment data stored across the PSS's of the local accelerator group need not be fully replicated. Here, each accelerator is responsible for a portion of the segment cache using cooperative caching techniques. As described above, when a reference for segment data managed by another accelerator needs to be resolved, the request can be sent either directly to that device or indirectly over the multicast group. Once the data has been reassembled and delivered to the client (or server), it can be discarded and need not be entered into the local PSS (since that segment data is being actively managed by the other transaction accelerator).

Figure 14:
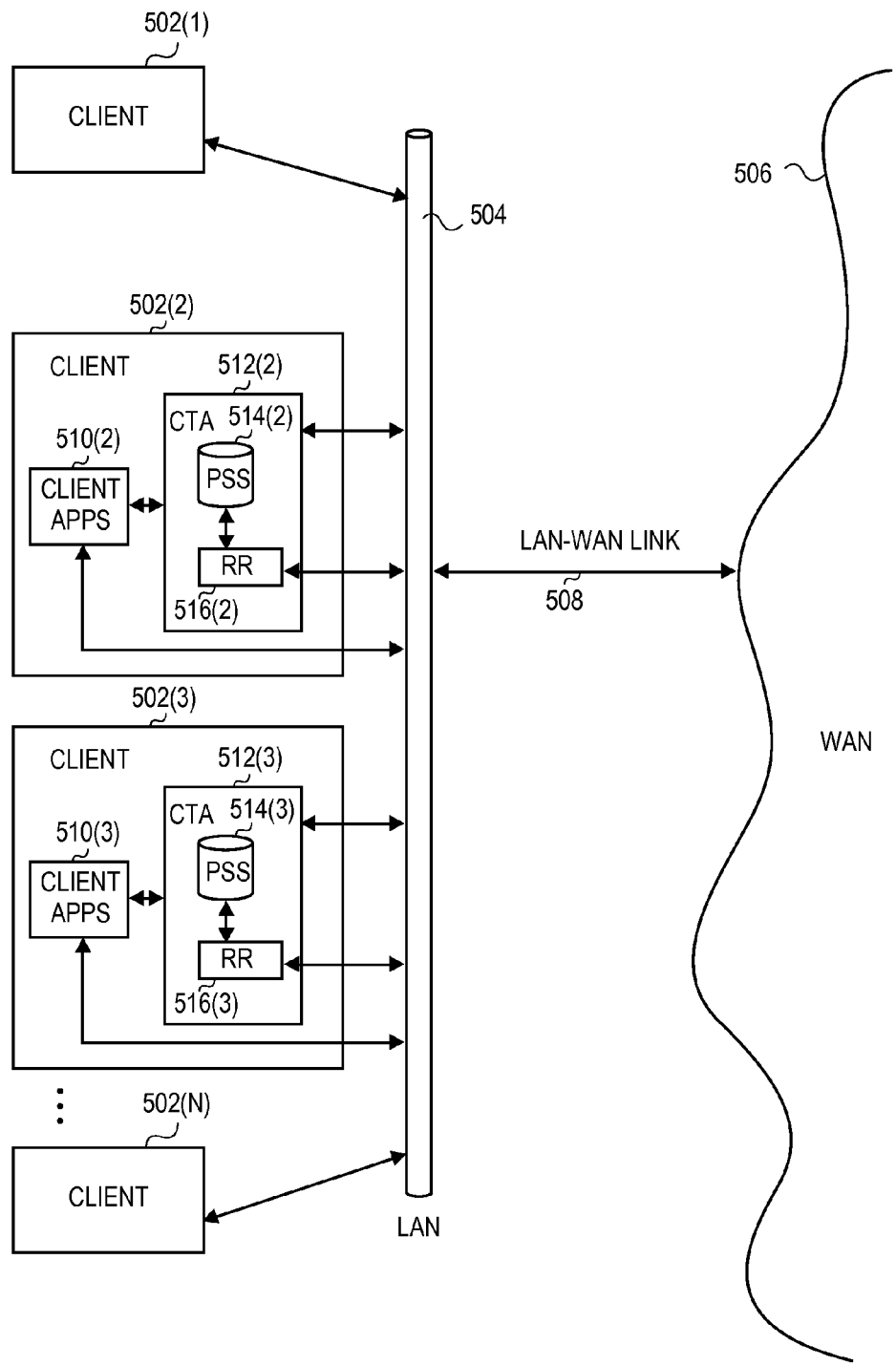
FIG. 14 is a block diagram showing a multicast implementation of a plurality of clients coupled locally through a LAN and to a WAN.

FIG. 14 shows a plurality of clients 502, with integrated CTA's. Clients 502 are coupled to a LAN 504, which in turn couples clients 502 to a WAN 506 via a LAN-WAN link 508. Not all clients on LAN 504 need include a CTA 512, but at least two clients are shown including integrated CTA's 512. Each CTA is shown including a PSS 514 and an RR 516. With this implementation, all of the functionality of the CTA can be implemented as software running on the client.

A client's CTA 512 handles the acceleration of transactions requested by the client applications 510 running on that client. For example, where an application running on client 502(2) initiates a transaction with a server that is to be accelerated, the connection would be to CTA 512(2). CTA 512(2) would then open a connection with a corresponding STA, much as described above, over LAN 504 and WAN 506. When CTA 512(2) receives a response message including a payload that has been accelerated, CTA 512(2) will use the contents of PSS 514(2) to deference the reference labels in the accelerated payload.

To achieve the benefit of segments that might have been between servers and other clients on LAN 504, the PSS's 514 can be cooperative PSS's. By cooperating, each CTA is able to use the segment bindings from its own PSS as well as the PSS's of other CTA's on LAN 504. Then, if a segment binding cannot be found locally, a CTA's RR can send a request for the binding over the WAN to the STA.

In some cases, when an RR receives a new binding (or its CTA creates one), it distributes the new binding to each of the other RR's on the LAN, so that each client's PSS is populated with the available bindings created on the LAN and a CTA will already have a copy of each of the bindings that are available on the LAN when the CTA is deferencing payloads. This is referred to herein as "prescriptive cooperation".

In other cases, the bindings are not distributed ahead of time, but are sent upon request. Thus, when an RR needs a binding it does not have, it makes a request of the other RR's on the LAN for the binding. This is referred to herein as "on-demand cooperation".

In a hybrid of these approaches, when an RR receives a new binding or its CTA creates one, it distributes a "binding notice" indicating the new segment's reference and the originating CTA to other CTA's on the LAN. When another CTA determines that it does not have a needed binding in its own PSS, that CTA's RR checks a list of previously received binding notices. If the needed binding is on the list, the requesting RR messages the originator CTA to obtain the binding. If the RR determines that it does not have the binding and does not have a binding notice from another CTA on the LAN, the RR sends a request for the binding over the WAN. This is referred to herein as "notice cooperation".

It should be understood that a given LAN can implement more than one of the above-described cooperation schemes. The messaging among RR's for cooperation can be done using multicasting. For example, each of the cooperating clients (or their CTA's or RR's) can be a member of a multicast group. For prescriptive cooperation, each originating CTA multicasts the new bindings it receives or creates. For on-demand cooperation, the requesting RR can multicast the request and the responding CTA(s) can unicast or multicast their answers. Multicasting their answers allows the other CTA that did not request the binding to receive it and possibly store it in that other CTA's PSS. For notice cooperation, the notices can be multicast, but for requests, those can be unicast because the requester will know which CTA has the requested binding. Of course, a notice cooperation system could be implemented where the binding notices do not indicate the origination CTA, or that information is not stored, in which case the binding request might be multicast, but the preferred approach when using notice cooperation is to keep track of which CTA sends which notice.

Figure 15:
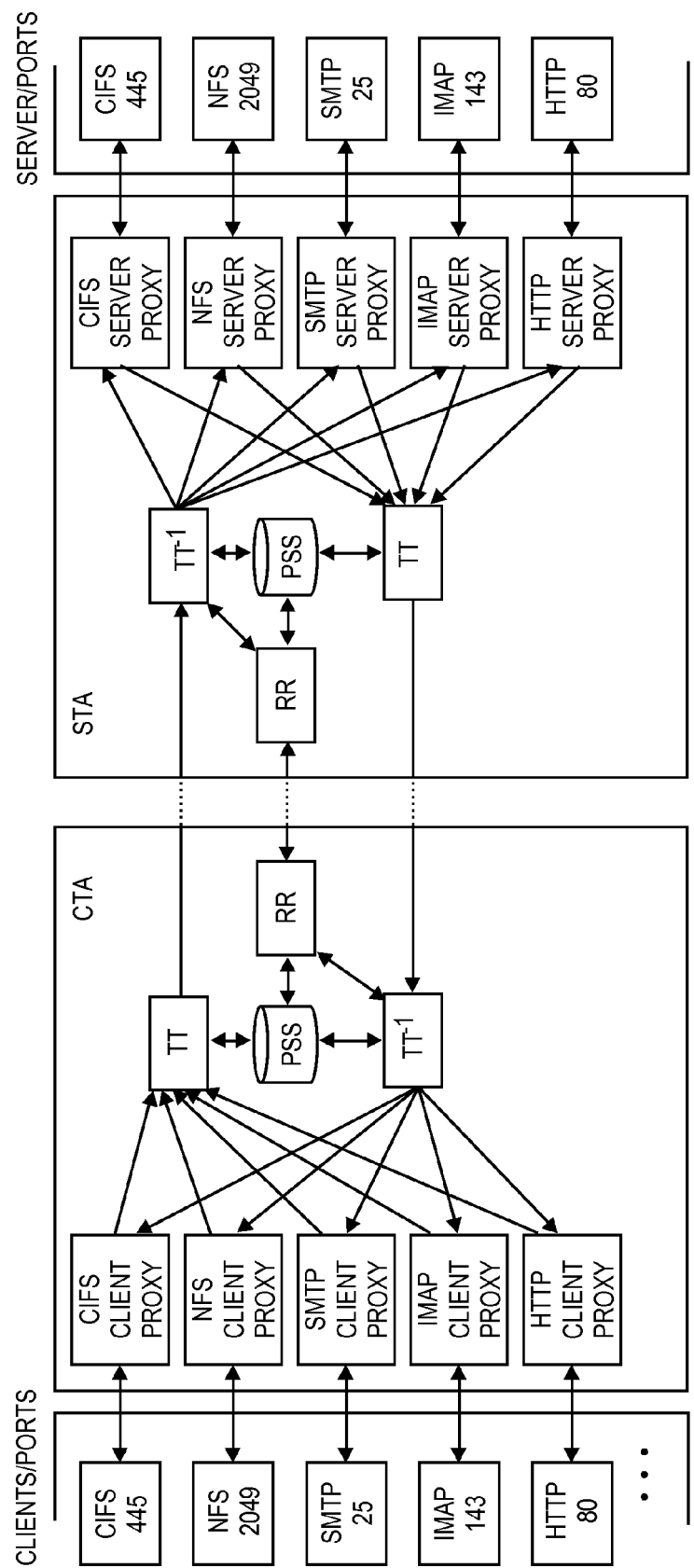
FIG. 15 is a block diagram of a networked system wherein transaction acceleration is implemented and the network handles a variety of protocols and services.

FIG. 15 a block diagram of a networked system wherein transaction acceleration is implemented and the network handles a variety of protocols and services. The CTA and STA are shown coupled to accelerate CIFS, NFS, SMTP, IMAP and HTTP transactions. In other arrangements, the servers are at varied locations and the clients are at varied locations. In each case, the transactions for the accelerated protocols pass through the CTA and the STA and can be accelerated as described above and be transparent to the clients and servers engaging in the transactions. In addition to the open protocols illustrated in the figure, the CTA's and STA's can accelerate transactions for proprietary protocols such as Microsoft Exchange™, Lotus Notes™, etc. As with other variations described herein, the TA's might be integrated in with the clients and servers. For example, some software vendors might include transaction acceleration as part of their client-server software suite.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed:

1. A system for accelerating communication between network hosts, comprising:
   a plurality of network devices comprising at least a first network device, a second network device and a third network device;
   referenced data storage, in each of the first, second and third network devices, the referenced data storage for storing referenced data that is referenced by globally unique references, a reference being globally unique in that it is distinguishable from other references that might be used to reference different referenced data;
   interception logic, in the first network device, for intercepting communications between a first network host and a second network host such that the communication is via the first network device and the second network device;
   transforming logic, in the first network device, for transforming data of a communication between the first host and the second host including at least substituting some of the data of the communication between the first network device to the second network device with globally unique references that reference data in the referenced data storage of at least one of the first, second or third network devices; and
   a reference resolver, in the second network device, that resolves received globally unique references that are unknown to the second network device by transmitting a request message to resolve the unknown reference of data, sent to at least one of the plurality of network devices other than the second network device.

2. The system of claim 1, wherein each of first, second and third network devices comprises a distinct referenced data storage, distinct interception logic, distinct transforming logic and a distinct reference resolver, and wherein the referenced data storage for a given network device contains referenced data usable for accelerating communications between the given network device and two or more other network devices.

3. The system of claim 1, wherein globally unique references are labels and reference data is stored as data sequences with each data sequence having an associated label.

4. The system of claim 1, wherein the transforming logic is configured to transform data of the communication between the first host and the second host by substituting globally unique references for data sequences, wherein the substituted globally unique references are associated with the substituted data sequences in the referenced data storage of the first host.

5. The system of claim 4, further comprising logic for storing data sequences to be replaced, storing into the referenced data storage, wherein a first data sequence is stored into the referenced data storage of the first network device with its globally unique reference prior to transforming the data of the first data sequence, thereby assuring a match.

6. The system of claim 1, wherein the first network device is a client-side transaction accelerator associated with the first host, the second network device is a server-side transaction accelerator associated with the second host, and wherein the communication is a client-server transaction between the first host and the second host.

7. The system of claim 6, further comprising a third host, wherein the third host is a server associated with the third network device, and wherein the transforming logic of the first network device is configured to use a globally unique reference in transactions both between the first host and the second host and between the first host and the third host when both the second host and third host are to receive, from the first host, referenced data in common.

8. The system of claim 1, wherein the globally unique references are such that a reference is globally unique in that it is distinguishable, during an expected lifetime of the reference, from other references that might be used during that expected lifetime to reference referenced data.

9. The system of claim 1, wherein the globally unique references are such that one data sequence can be used in more than one unrelated transaction and the globally unique references are globally unique within a group of conditions, but could be duplicated for different data sequences that would occur under a distinct group of conditions.

10. The system of claim 9, wherein the group of conditions includes a timeframe and a given globally unique reference is unique within one timeframe but could be duplicated for reuse in another timeframe, the system further comprising logic for deleting globally unique references and referenced data from the referenced data storage when a timeframe for lifetime of those referenced data items expires.

11. The system of claim 1, wherein the referenced data storage includes more than one copy of a given referenced data item, each with distinct references, with duplication based on parameters about the transactions in which the referenced data items are used.

12. The system of claim 1, wherein the referenced data storage includes only one copy of a given referenced data item that is used in more than one transaction with more than one host.

13. The system of claim 1, wherein a given referenced data item and its globally unique reference is used over multiple network devices and multiple transactions with different hosts.

14. The system of claim 1, wherein a value of a globally unique reference is a hash function of the data that the globally unique reference is substituted for.

15. A method for accelerating communication between network hosts in a network having a plurality of network devices comprising at least a first network device, a second network device and a third network device, the method comprising:
   storing referenced data that is referenced by globally unique references, a reference being globally unique in that it is distinguishable from other references that might be used to reference different referenced data;
   wherein each of the first, second, and third network devices is associated with a referenced data storage;
   intercepting communications between a first network host and a second network host such that the communication is via the first network device and the second network device;
   transforming data of a communication between the first host and the second host including at least substituting some of the data of the communication between the first network device to the second network device with globally unique references that reference data in the referenced data storage of at least one of the first, second or third network devices; and receiving and resolving globally unique references that are unknown to the second network device by transmitting a request message to resolve the unknown reference of data, sent to at least one of the plurality of network devices other than the second network device.

16. The method of claim 15, wherein:

each of first, second and third network devices comprises a distinct referenced data storage and is capable of intercepting communications, transforming data, and receiving and resolving globally unique references; and the referenced data storage for a given network device contains referenced data usable for accelerating communications between the given network device and two or more other network devices.

17. The method of claim 15, wherein globally unique references are labels and reference data is stored as data sequences with each data sequence having an associated label.

18. The method of claim 15, wherein transforming data of the communication between the first host and the second host is performed by substituting globally unique references for data sequences, wherein the substituted globally unique references are associated with the substituted data sequences in the referenced data storage of the first host.

19. The method of claim 18, further comprising storing a first data sequence into the referenced data storage of the first network device with its globally unique reference prior to transforming the data of the first data sequence, thereby assuring a match.

20. The method of claim 15, wherein the first network device is a client-side transaction accelerator associated with the first host, the second network device is a server-side transaction accelerator associated with the second host, and wherein the communication is a client-server transaction between the first host and the second host.

21. The method of claim 20, further comprising a third host, wherein the third host is a server associated with the third network device, and the first network device uses a globally unique reference in transactions both between the first host and the second host and between the first host and the third host when both the second host and third host are to receive, from the first host, referenced data in common.

22. The method of claim 15, wherein the globally unique references are such that a reference is globally unique in that it is distinguishable, during an expected lifetime of the reference, from other references that might be used during that expected lifetime to reference referenced data.

23. The method of claim 15, wherein the globally unique references are such that one data sequence can be used in more than one unrelated transaction and the globally unique references are globally unique within a group of conditions, but could be duplicated for different data sequences that would occur under a distinct group of conditions.

24. The method of claim 23, wherein the group of conditions includes a timeframe and a given globally unique reference is unique within one timeframe but could be duplicated for reuse in another timeframe, the system further comprising logic for deleting globally unique references and referenced data from the referenced data storage when a timeframe for lifetime of those referenced data items expires.

25. The method of claim 15, wherein the referenced data storage includes more than one copy of a given referenced data item, each with distinct references, with duplication based on parameters about the transactions in which the referenced data items are used.

26. The method of claim 15, wherein the referenced data storage includes only one copy of a given referenced data item that is used in more than one transaction with more than one host.

27. The method of claim 15, wherein a given referenced data item and its globally unique reference is used over multiple network devices and multiple transactions with different hosts.

28. The method of claim 15, wherein a value of a globally unique reference is a hash function of the data that the globally unique reference is substituted for.

* * * * *